United States Patent [19]

Lassiter, Jr. et al.

[11] Patent Number: 4,892,179
[45] Date of Patent: Jan. 9, 1990

[54] BUCKET DISTRIBUTION SYSTEM

[75] Inventors: Jimmie F. Lassiter, Jr.; David R. Slager, both of San Antonio, Tex.

[73] Assignee: Meyer Machine Company, San Antonio, Tex.

[21] Appl. No.: 231,720

[22] Filed: Aug. 11, 1988

[51] Int. Cl.$^4$ ............................................. B65G 47/46
[52] U.S. Cl. .................................. 198/365; 198/703; 198/706
[58] Field of Search ............... 198/356, 358, 365, 366, 198/370, 703, 706

[56] References Cited

U.S. PATENT DOCUMENTS

| | | |
|---|---|---|
| 658,656 | 9/1900 | Le Grand . |
| 690,518 | 1/1902 | Frith ...................................... 198/365 |
| 720,963 | 2/1903 | Petersen ............................... 199/365 |
| 725,573 | 4/1903 | Le Grand . |
| 748,576 | 1/1904 | Bivert . |
| 2,189,243 | 2/1940 | Evans ..................................... 198/706 |
| 2,426,304 | 8/1947 | Hapman . |
| 2,435,498 | 2/1948 | Hapman . |
| 2,704,177 | 3/1955 | Neaves . |
| 3,006,452 | 10/1961 | Hill ........................................ 198/358 |
| 3,055,486 | 9/1962 | Meyer ................................... 198/706 |
| 3,293,776 | 12/1966 | Stanke . |
| 3,357,539 | 12/1967 | Naslund ............................... 198/366 |
| 3,550,752 | 12/1970 | Vaughn Gregor . |
| 4,211,054 | 7/1980 | Sramek . |
| 4,366,628 | 1/1983 | George . |
| 4,722,433 | 2/1988 | Gough . |

*Primary Examiner*—Joseph E. Valenza
*Attorney, Agent, or Firm*—Richard J. Smith

[57] ABSTRACT

A bucket distribution system for receiving products at an infeed station and selectively discharging the products at a plurality of distribution stations. A plurality of buckets travel in a continuous path and each receive a predetermined portion of products at an infeed station. Bucket trip apparatus at each of the discharge stations selectively pivots the buckets in a direction opposite to the direction of bucket travel to cause the buckets to discharge products therein. Feeders at primary distribution stations are adapted to roll in and out of position for servicing. Products may recirculate within the system to thereby reduce the amount of products taken off-line.

7 Claims, 19 Drawing Sheets

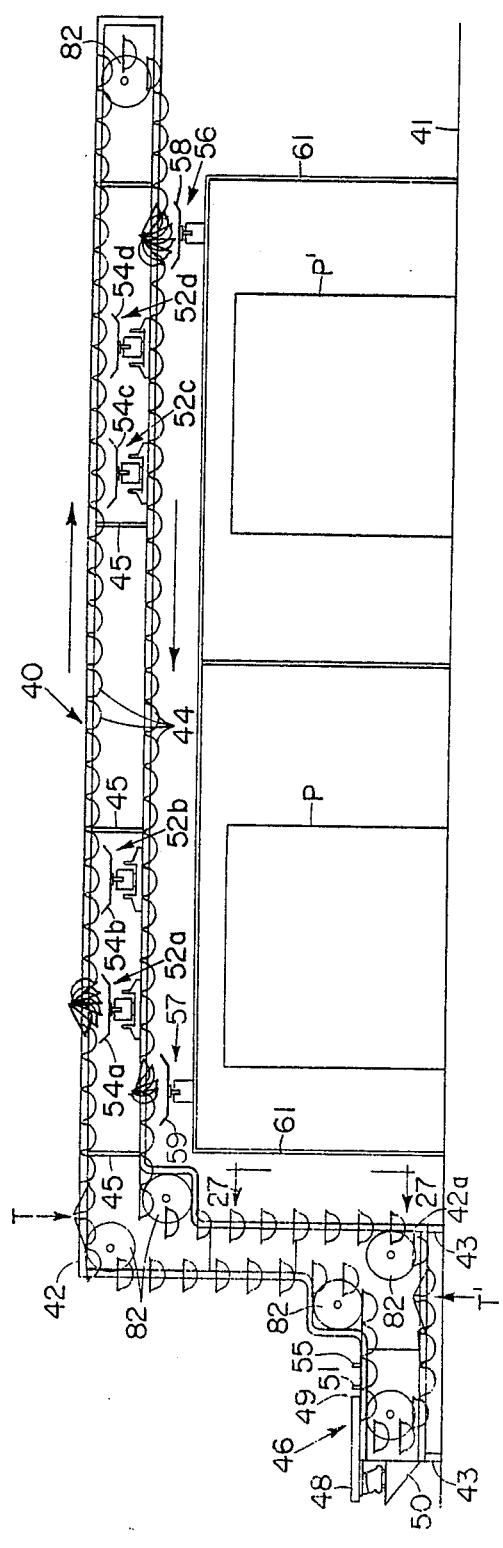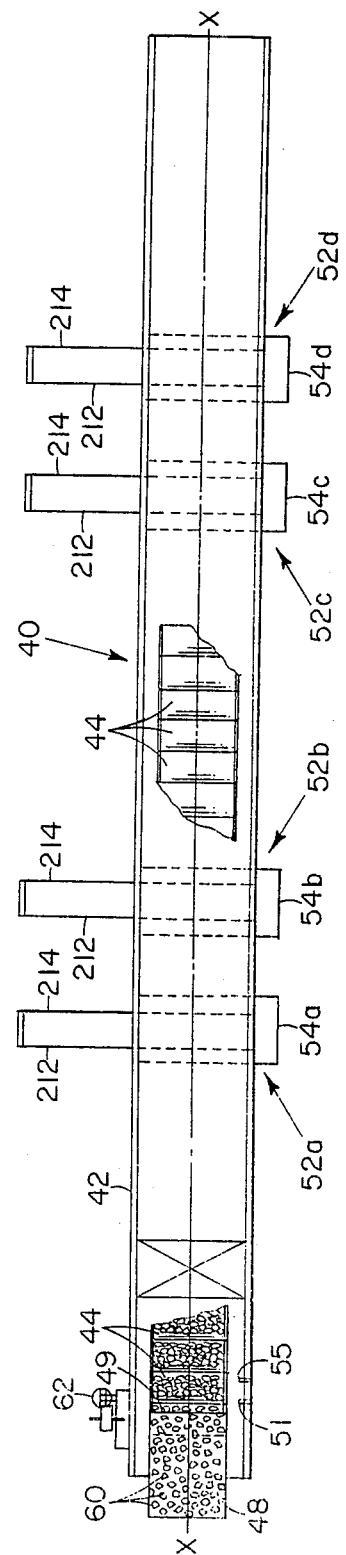

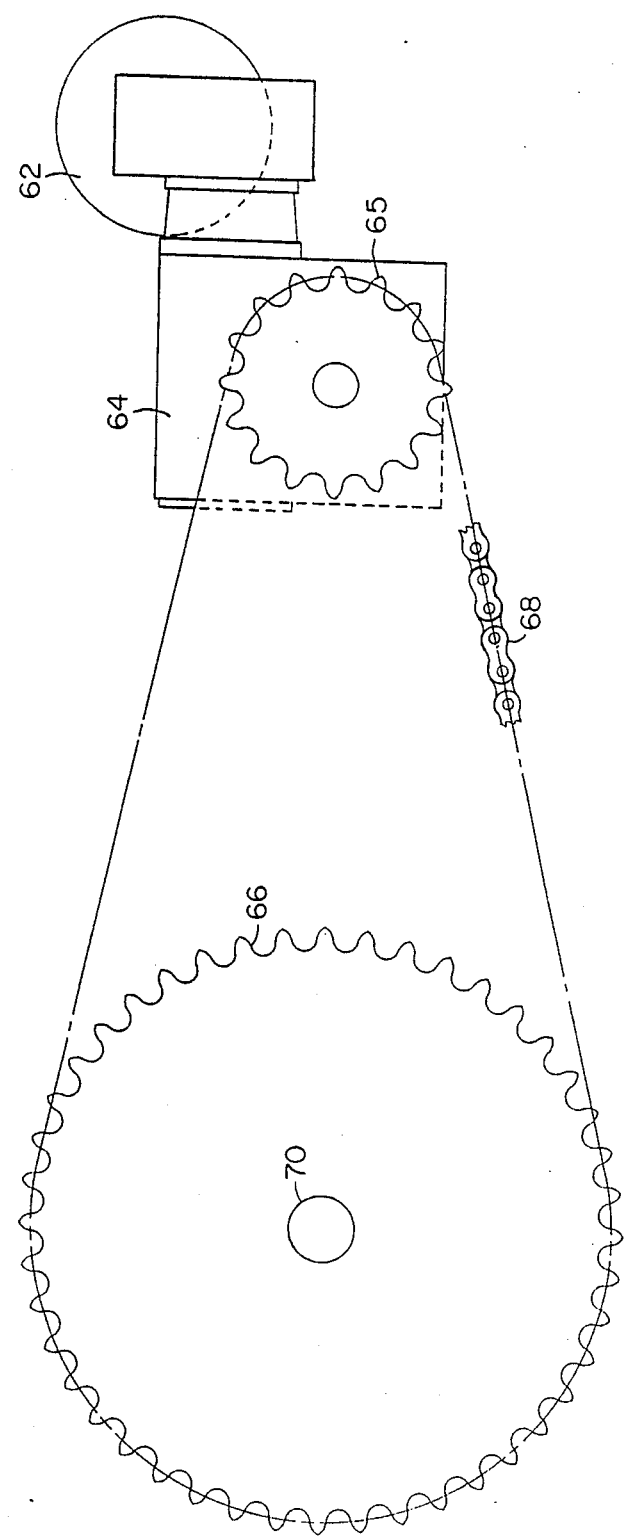

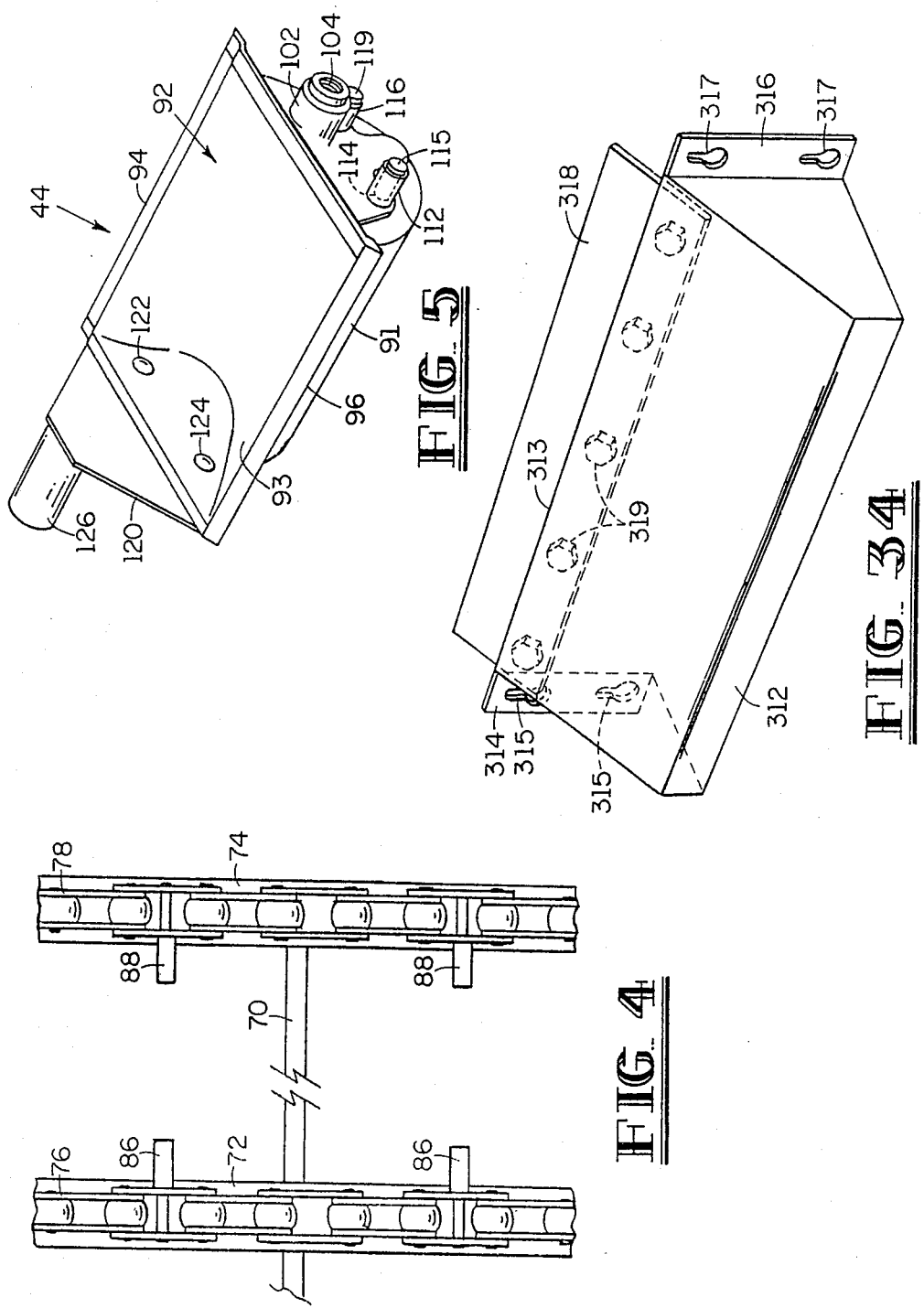

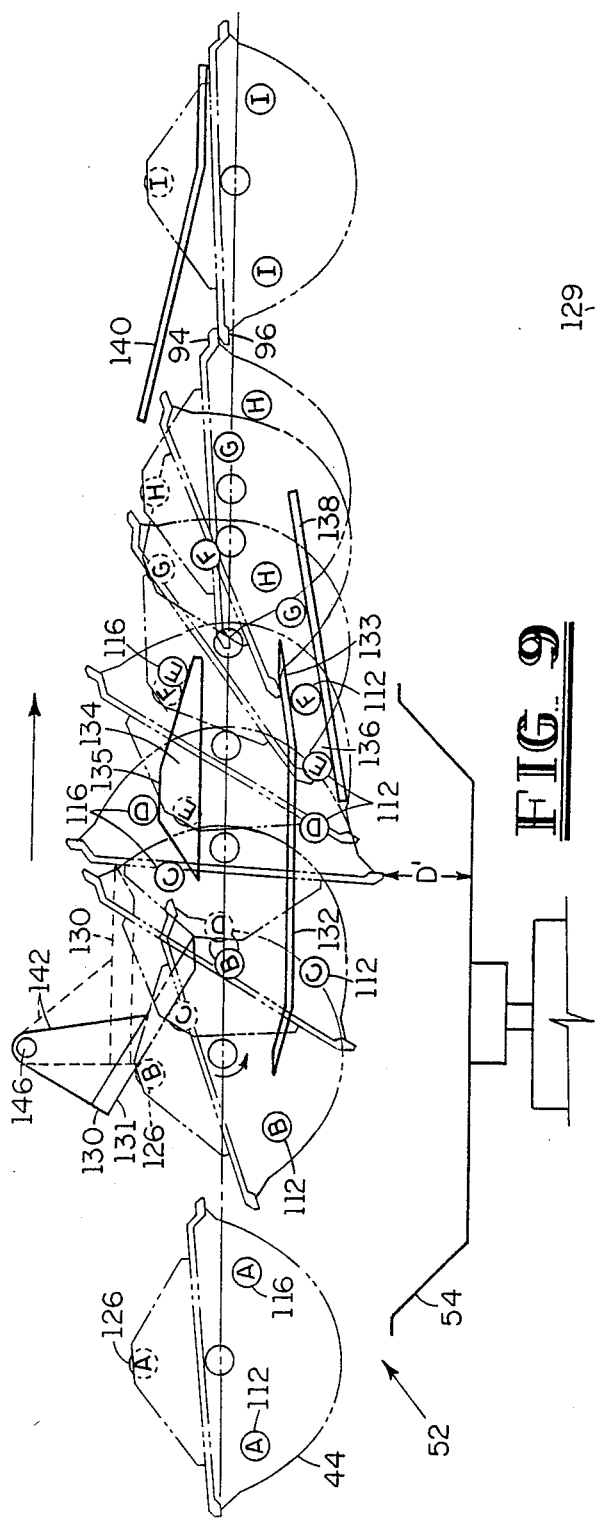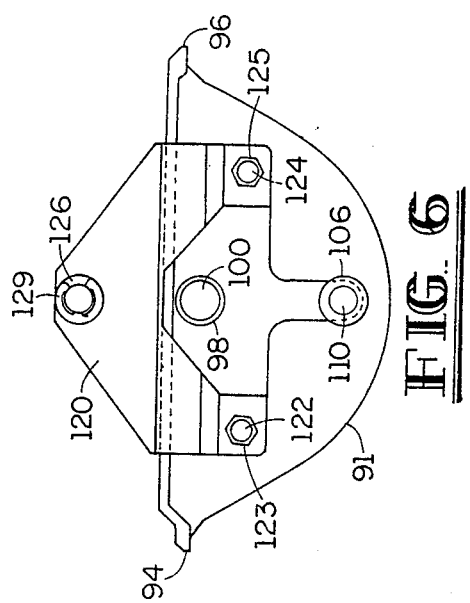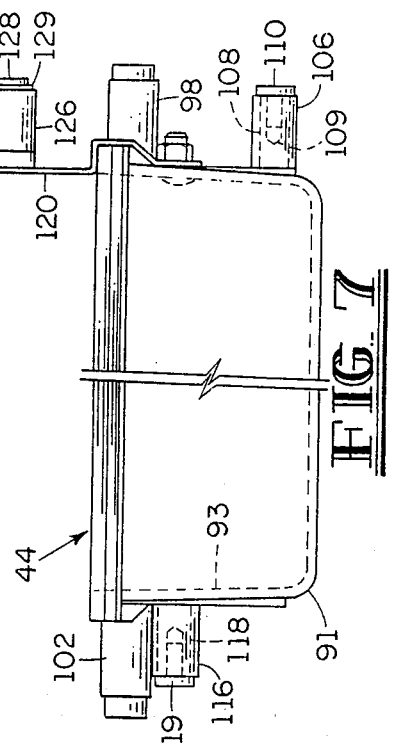

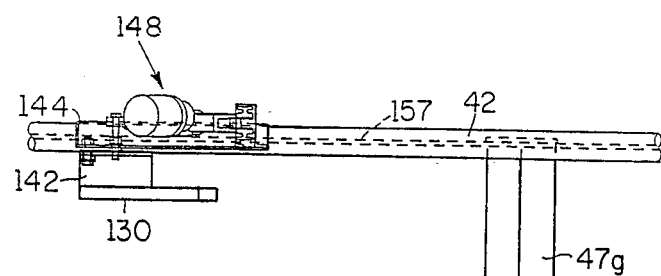
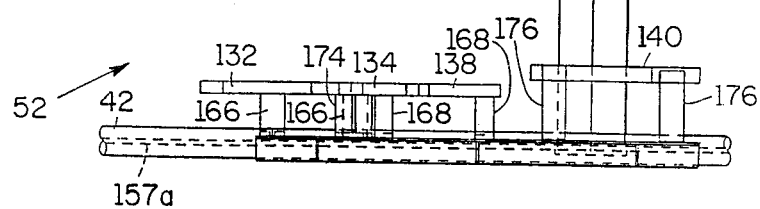
FIG. 11
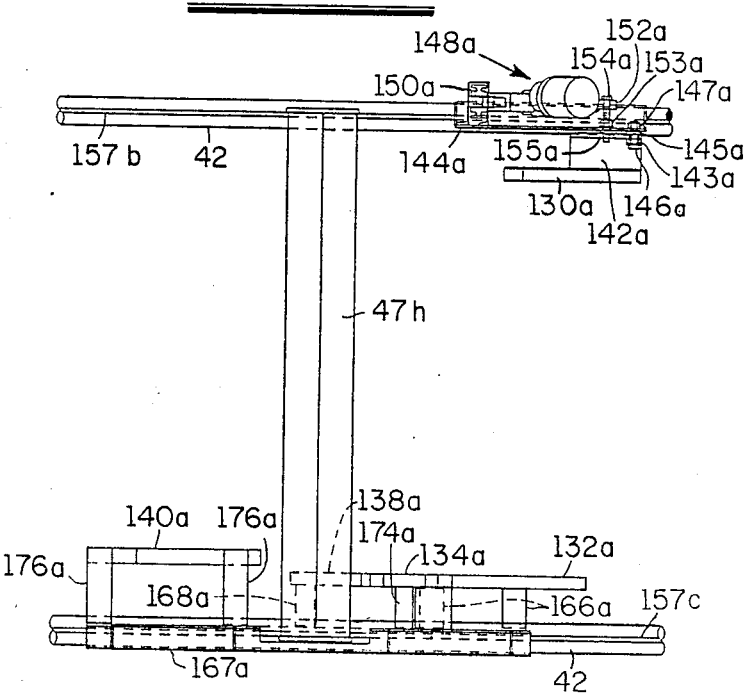
FIG. 12

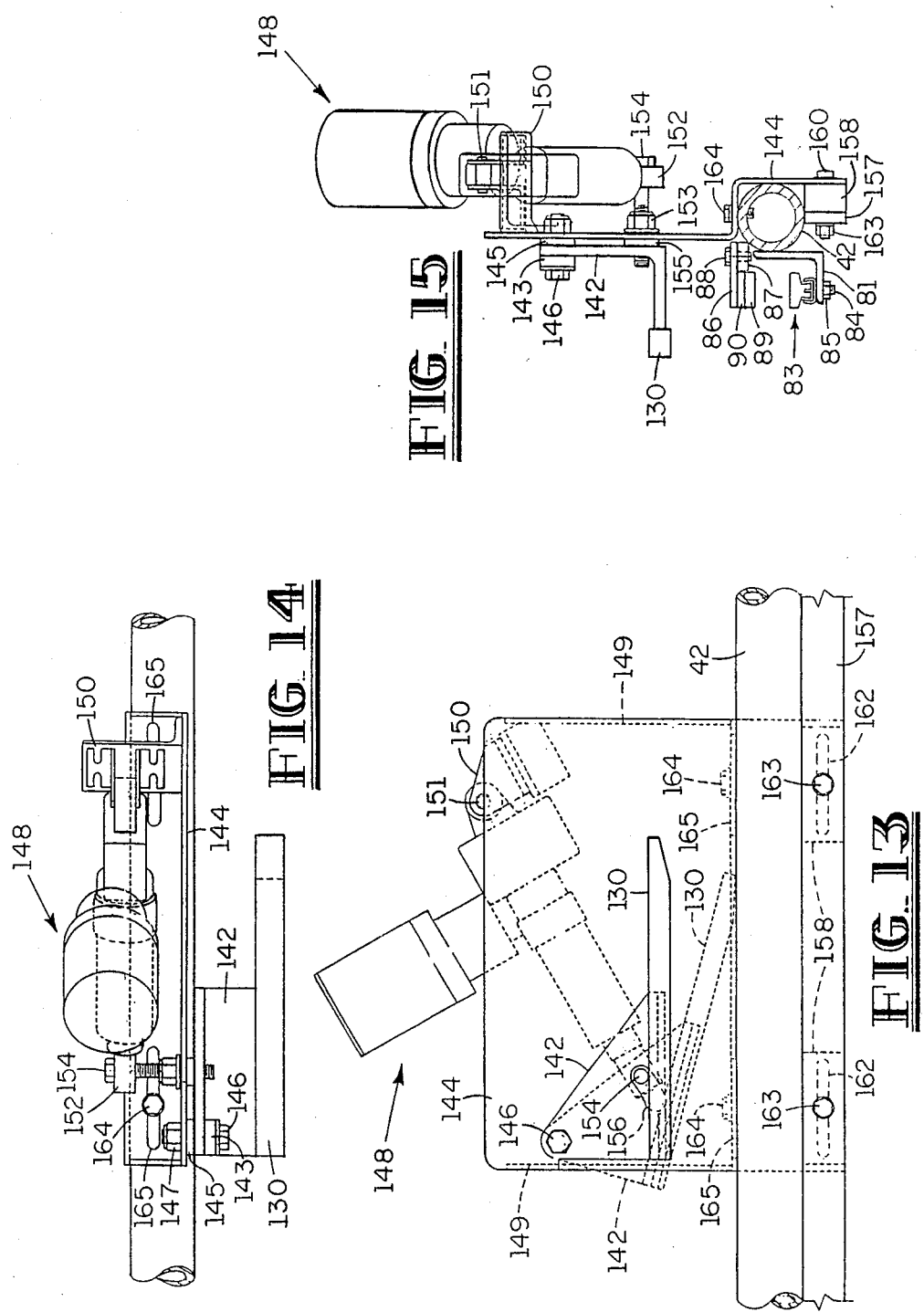

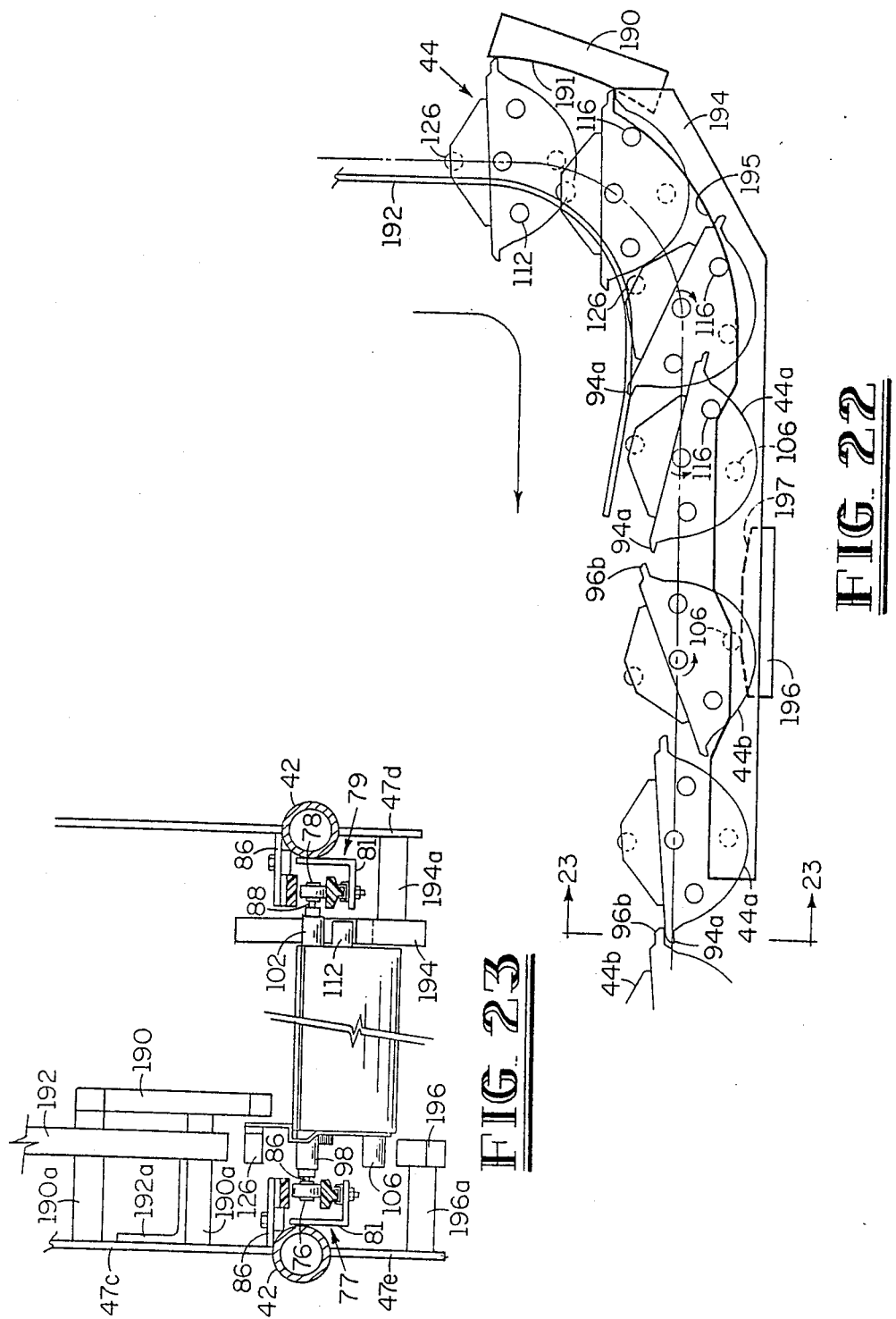

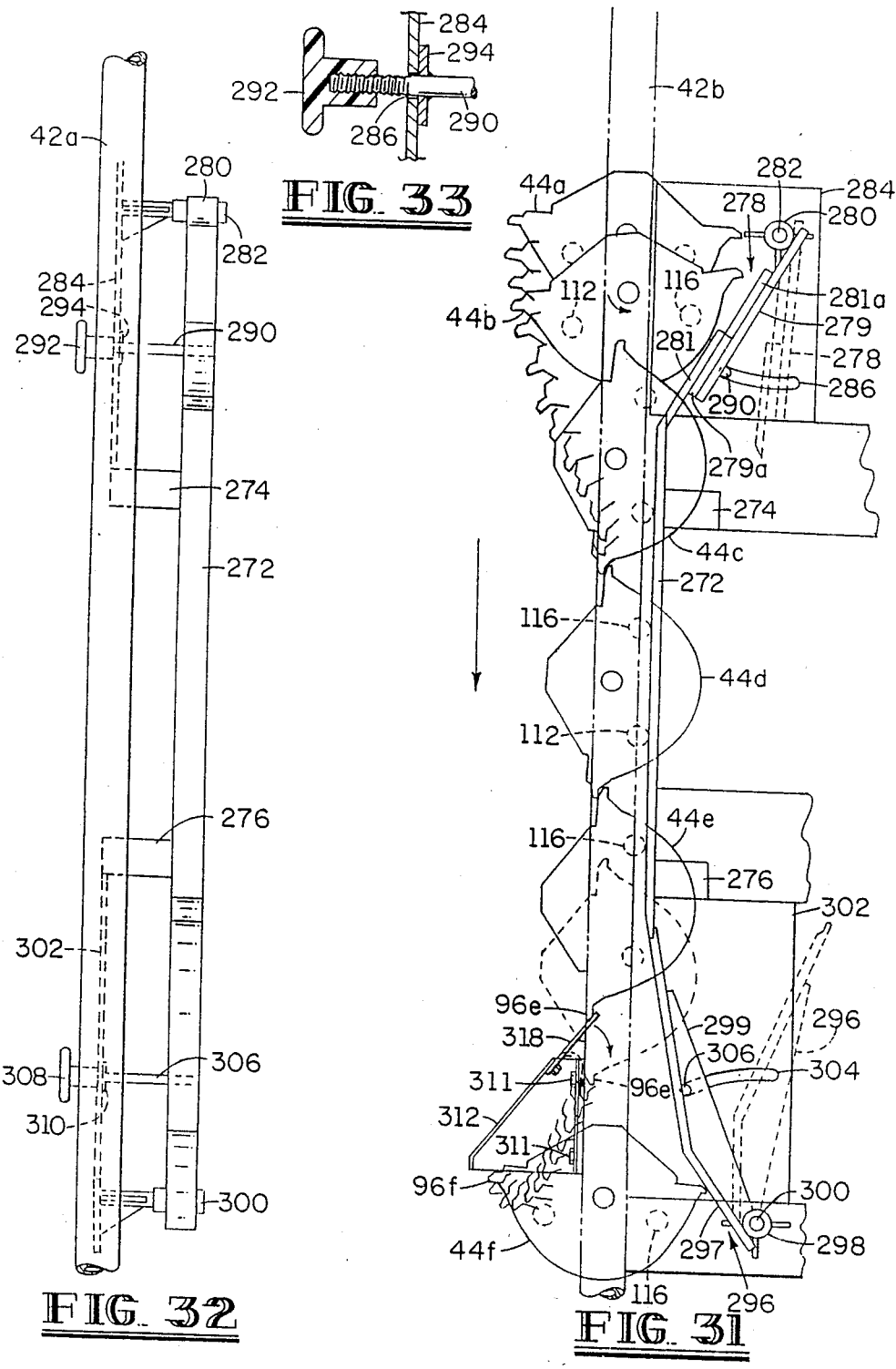

BUCKET DISTRIBUTION SYSTEM

BACKGROUND OF THE INVENTION

The present invention relates to a bucket conveyor for transporting products to a plurality of distribution stations More particularly, the present invention relates to a bucket distribution system for transporting fragile products to a plurality of distribution stations and discharging the products evenly or on demand at each of the stations.

The use of vibratory conveyors or belt conveyors for distributing products to a plurality of distribution stations is known in the art. However, vibratory and belt conveyors have inherent limitations which make them undesirable for use in distributing fragile products, such as crackers or other bakery goods. For example, vibratory conveyors may damage the products due to the conveyor's vibrations. Belt conveyors may allow the products to become trapped beneath the belts. Further, in order for a vibratory or belt conveyor to provide products on demand at each distribution station, the conveyor system must provide "in process" storage prior to distribution. However, "in process" storage requires additional handling of the products, which is inherently undesirable for fragile products, such as crackers or other bakery goods. Alternatively, a vibratory or belt conveyor must be run continuously with each module operating in order to provide products on demand at each distribution station. However, in such a system the products have only one opportunity to be discharged before being taken off-line.

SUMMARY OF THE INVENTION

Accordingly, the present invention provides a bucket distribution system for gentle handling of fragile products. The distribution system of the present invention is designed to gently transport fragile products to a plurality of distribution stations and to gently discharge products at each of the stations The products may be distributed at selected primary stations on demand or evenly distributed among the selected primary stations. Unlike prior vibratory or belt conveyor systems, the present invention allows products to be stored or accumulated within the system. This is accomplished by allowing the buckets to recirculate within the system, thereby reducing the handling and transferring of the products, providing at least twice the opportunity for the products to be discharged, and minimizing the amount of products taken off-line in the event of a disruption at a receiving station or stations.

The present invention comprises apparatus for transporting a plurality of buckets in a continuous path and bucket trip apparatus adapted to selectively pivot the buckets at distribution stations. Each of the buckets receives a first or second portion of products at an infeed station. In the preferred embodiment, an infeed vibratory feeder continuously distributes a predetermined portion of products to each of the buckets. As the buckets approach each of a plurality of successive primary distribution stations, bucket trip apparatus may be activated to cause selected ones of the buckets to pivot and discharge any and all products therein. The buckets may be pivoted on demand at the primary distribution stations or be assigned to particular primary distribution stations so as to provide an even distribution of products. A controller tracks the position of the buckets and amount of products within the buckets and signals the tripping of the buckets in response to appropriate input which indicates that certain conditions are satisfied. The buckets recirculate to the infeed station after passing all of the primary distribution stations.

In the preferred embodiment, the feed rate of the infeed vibratory feeder and the bucket travel speed are set so that the predetermined portion of products is approximately forty percent (40%) of bucket capacity. That is, as each bucket passes beneath the infeed conveyor, it will receive products in an amount approximately equivalent to forty percent (40%) of the bucket capacity. When an empty bucket reaches the discharge end of the infeed vibratory feeder, the bucket will receive a first portion of products such that, in the preferred embodiment, the bucket will thereafter be approximately forty percent (40%) full. Buckets receiving a first portion of products at the infeed station are thereafter transported to the primary distribution stations and preferably tripped so as to discharge the products therefrom However, if a disruption should occur at any primary station or stations receiving products, the buckets which would have normally dumped at those stations will bypass such stations and recirculate past the infeed station, thus receiving a second portion of products such that, in the preferred embodiment, the buckets will thereafter be approximately eighty percent (80%) full. All buckets passing the terminal or final discharge station and thereafter receiving a second portion of products are said to contain stored or accumulated products Once the disruption at the primary stations is cleared, the accumulated products will be discharged at the primary stations. Accordingly, the present invention permits temporary internal storage or accumulation of products when one or more primary distribution stations are disrupted.

In the preferred embodiment of the present invention, a secondary distribution station is provided intermediate to the terminal primary distribution station and the infeed station to insure that buckets do not recirculate to the infeed station with more than a first portion of the products. The secondary distribution station is provided with bucket trip apparatus which may be adjusted so as to cause each of the buckets to pivot and discharge any products therein in excess of a first portion of products. However, a first portion of products will remain in the buckets and recirculate to the primary distribution stations.

In the preferred embodiment of the present invention, an auxiliary distribution station is provided intermediate to the terminal primary distribution station and the secondary distribution station for bulk purging of products from the system. The auxiliary distribution station is further provided with bucket trip apparatus for causing the buckets to pivot and thereby discharge products therefrom. The bucket trip apparatus associated with the primary, secondary and auxiliary distribution stations is designed to pivot the buckets in a direction opposite or counter to the direction of travel such that the leading edge of a bucket is pivoted rearward and the trailing edge of the bucket is pivoted forward, thereby providing a gentle discharge of products from the bucket. Further, each distribution station is preferably provided with a vibratory feeder for receiving the products from the buckets and further distributing the products. Each of the primary distribution stations is further provided with apparatus for readily moving the associated feeder into position for receiving products and out of position for servicing the feeder. Finally, the present invention is provided with bucket cleaning apparatus and apparatus for facilitating the addition and removal of buckets from the system.

BRIEF DESCRIPTION OF THE DRAWINGS

FIG. 1 is an elevation view of the preferred embodiment of the bucket distribution system of the present invention.

FIG. 2 is a top view of the preferred embodiment of the bucket distribution system of the present invention.

FIG. 3 is a schematic view of the master sprocket drive apparatus in the preferred embodiment of the bucket distribution system of the present invention.

FIG. 4 is a partial cut-away view of the chain drive apparatus in the preferred embodiment of the bucket distribution system of the present invention.

FIG. 5 is a perspective view of a bucket utilized in the preferred embodiment of the bucket distribution system of the present invention.

FIG. 6 is a side view of a bucket utilized in the preferred embodiment of the bucket distribution system of the present invention.

FIG. 7 is an end view of a bucket utilized in the preferred embodiment of the bucket distribution system of the present invention.

FIG. 9 is a side view of the primary bucket trip apparatus in the preferred embodiment of the bucket distribution system of the present invention illustrating sequential views of a pivoting bucket.

FIG. 11 is a partial top view of the preferred embodiment of the bucket distribution system of the present invention illustrating the bucket trip apparatus for the primary distribution stations.

FIG. 12 is a partial top view of the preferred embodiment of the bucket distribution system of the present invention illustrating the bucket trip apparatus for the auxiliary distribution station.

FIG. 13 is a partial side view of the bucket trip apparatus for the primary distribution stations in the preferred embodiment of the bucket distribution system of the present invention.

FIG. 14 is a partial top view of the bucket trip apparatus for the primary distribution stations in the preferred embodiment of the bucket distribution system of the present invention.

FIG. 15 is a partial end view of the bucket trip apparatus for the primary distribution stations in the preferred embodiment of the bucket distribution system of the present invention.

FIG. 22 is a side view of the lower tail change apparatus in the preferred embodiment of the bucket distribution system of the present invention.

FIG. 23 is an end view of the lower tail change apparatus in the preferred embodiment of the bucket distribution system of the present invention taken along lines 23—23 of FIG. 22.

FIG. 31 is a side view of the bucket cleaning apparatus in the preferred embodiment of the bucket distribution system of the present invention.

FIG. 32 is a partial elevation view of the bucket cleaning apparatus in the preferred embodiment of the bucket distribution system of the present invention.

FIG. 33 is a partial cross-sectional view of the bucket cleaning apparatus in the preferred embodiment of the bucket distribution system of the present invention.

FIG. 34 is a perspective view of the clean out skirt utilized in the preferred embodiment of the bucket distribution system of the present invention.

DETAILED DESCRIPTION OF THE PREFERRED EMBODIMENT

Figure 8:
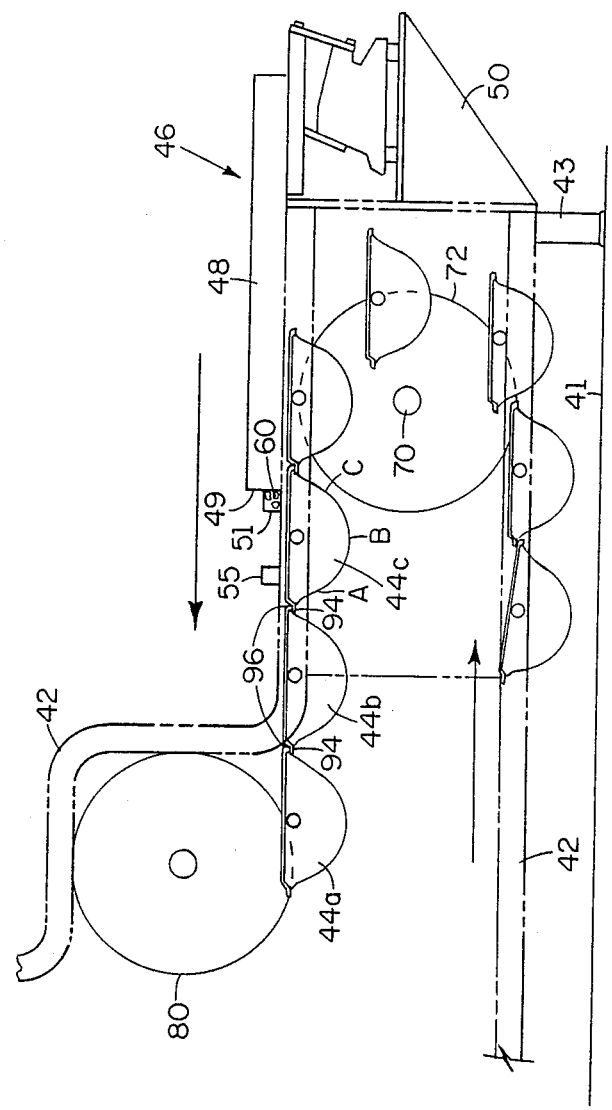
FIG. 8 is a side view of the infeed station in the preferred embodiment of the bucket distribution system of the present invention.

Referring to FIG. 1 and FIG. 2, the bucket distribution system or apparatus of the present invention is identified by the number 40. The system 40 comprises an open tubular frame 42 supporting a plurality of chain driven buckets 44. As illustrated in FIG. 2, frame 42 has a longitudinal axis X—X. The frame 42 may be supported on a floor 41 by a plurality of legs 43. The frame 42 may also be supported from a ceiling by wires or beams (not shown) appropriately connected to frame brackets 45. The distribution system 40 further comprises an infeed station 46 for transporting products from processing or another conveyor (not shown) to the buckets 44. In the embodiment shown in FIG. 1 and FIG. 2, the infeed station 46 comprises an electromagnetic vibratory feeder 48 having a discharge end 49. The feeder 48 is preferably supported by a brace 50 which is bolted or otherwise appropriately mounted to the frame 42. The feeder 48 is adapted to feed products 60, such as crackers or other bakery goods, to the buckets 44. A photodetector 51 is appropriately mounted to the frame 42 so as to detect the feeding of products 60 to buckets 44. Photodetector 51 is preferably a proximity photocell adapted to detect the reflection of light off of the products 60. A magnetic field type proximity switch 55 is also appropriately mounted to the frame 42 so as to detect when each of the buckets 44 has passed by switch 55.

Referring again to FIG. 1 and FIG. 2, the distribution system 40 further comprises a plurality of primary or upper distribution or discharge stations 52a, 52b, 52c, and 52d. Stations 52a, 52b, 52c, and 52d each include an electromagnetic vibratory feeder 54a, 54b, 54c, and 54d, respectively, for receiving products 60 from buckets 44 and distributing or conveying the products 60 to packaging machines or to another conveyor (not shown). As illustrated in FIG. 1, feeders 54a and 54b feed products 60 to packaging machine P and feeders 54c and 54d feed products 60 to packaging machine P. As used herein, the number 52 identifies a primary distribution or discharge station and the number 54 identifies the vibratory feeder associated with such distribution or discharge station. The distribution system 40 also comprises an auxiliary distribution or discharge station 56 and a secondary or lower discharge or distribution station 57. Stations 56 and 57 each include an electromagnetic vibratory feeder 58 and 59, respectively, for receiving products 60 from buckets 44 and distributing or conveying the products 60 to off-line storage. Feeders 58 and 59 may be mounted atop a platform 61 or other structure adequate to support feeders 58 and 59. Auxiliary station 56 is preferably used to permanently remove damaged products 60 from the system 40. Secondary station 57 is used to recirculate products 60 to the infeed station 46. As will be described in greater detail hereinbelow, the distribution system 40 further comprises trip apparatus (not shown in FIG. 1 or FIG. 2) for causing the buckets 44 to pivot in a direction opposite or counter to the direction of bucket travel and thereby selectively discharge products 60 therefrom at distribution stations 52, 56 and 57. The pivoting of the buckets 44 is illustrated in FIG. 1 at stations 52a, 56, and 57. For purposes of clarity, buckets 44 are merely illustrated generally in FIG. 1 and FIG. 2 and only several buckets 44 are illustrated in FIG. 2.

Figure 21:
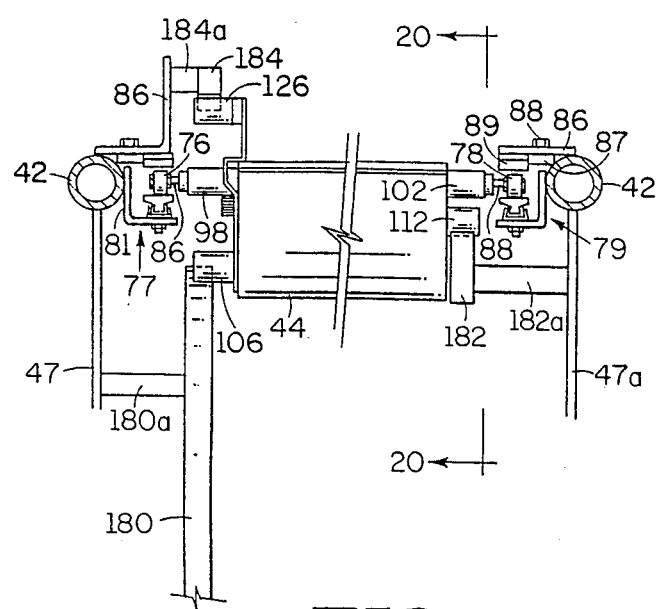
FIG. 21 is an end view of the upper tail change apparatus in the preferred embodiment of the bucket distribution system of the present invention.
Figure 24:
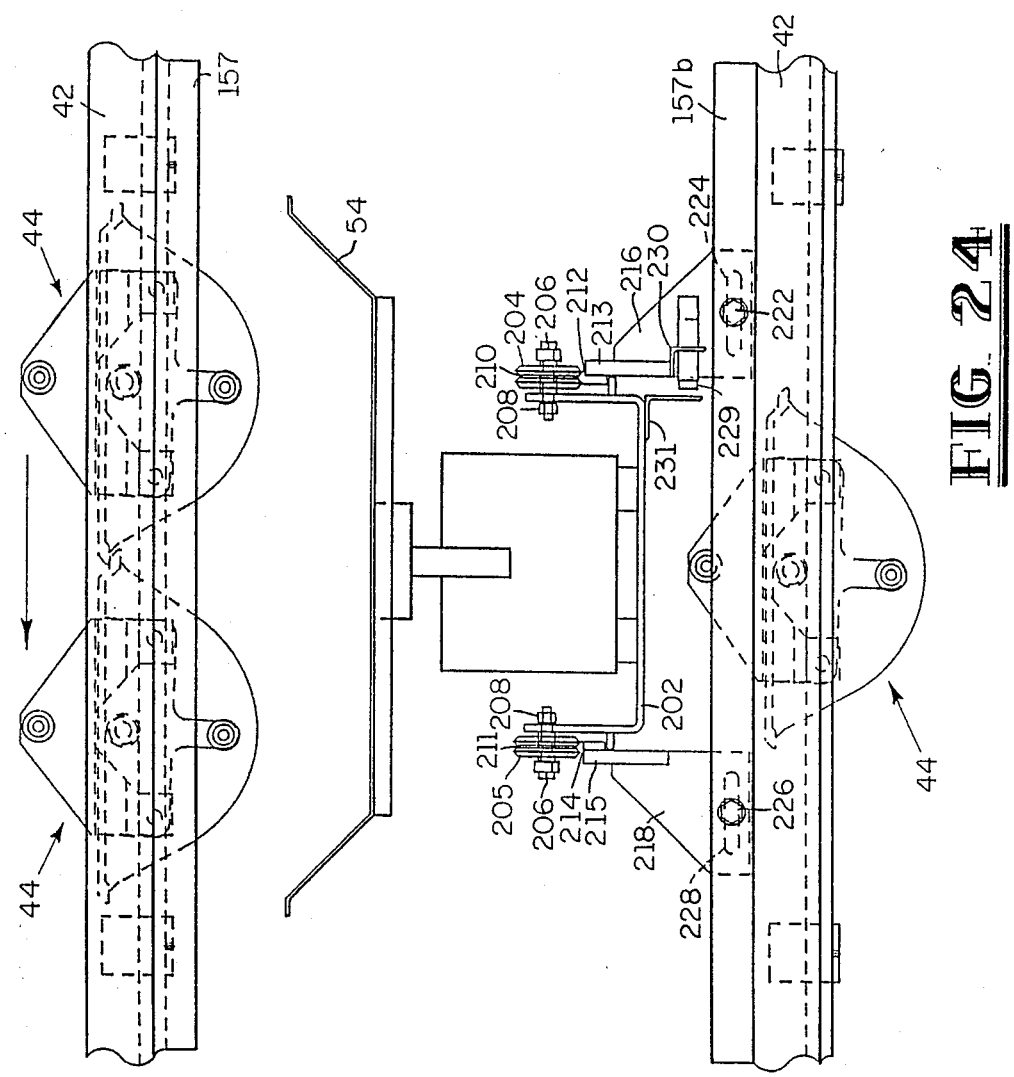
FIG. 24 is a partial side view of a primary discharge station in the preferred embodiment of the bucket distribution system of the present invention illustrating the retractable feeder apparatus.

Referring to FIG. 3 and FIG. 4, the preferred embodiment of the bucket drive mechanism of the present invention will be described in greater detail. A motor 62 drives a gearbox 64 which, in turn, drives a master sprocket 66 by means of a chain 68 which is operatively engaged with gear box sprocket 65 and master sprocket 66. The master sprocket 66 is operatively engaged with a master driveshaft 70. Driveshaft 70 is operatively engaged with a first drive sprocket 72 and a second drive sprocket 74. A first roller chain 76 is operatively engaged with first drive sprocket 72 and a second roller chain 78 is operatively engaged with second drive sprocket 74. Sprockets 72 and 74 are appropriately mounted to frame 42. Chain 76 is also operatively engaged with a plurality of idler sprockets 80 which are appropriately mounted to frame 42. Chain 76 is a continuous or closed strand of double pitch carrier roller chain. Chain 78 is also operatively engaged with a plurality of idler sprockets 82 which are appropriately mounted to frame 42 substantially parallel to sprockets 80. Chain 78 is a continuous or closed strand of double pitch carrier roller chain. Chain 76 is provided with a plurality of pins 86 which are connected thereto and extend outward therefrom. Chain 78 is provided with a plurality of pins 88 which are connected thereto and extend outward therefrom. As illustrated in FIG. 21 and FIG. 23, each bucket 44 is pivotally supported by a pin 86 and an oppositely disposed pin 88 which is substantially aligned with such pin 86.

Figure 19:
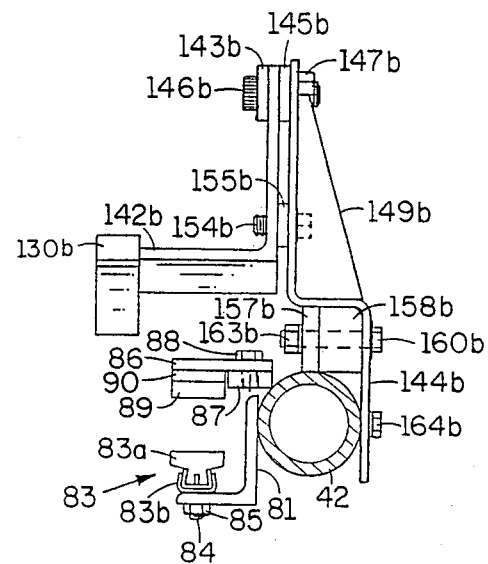
FIG. 19 is a partial end view of the bucket trip apparatus for the secondary distribution station in the preferred embodiment of the bucket distribution system of the present invention.

As further illustrated in FIG. 21 and FIG. 23, chains 76 and 78 are mounted within substantially parallel chain tracks 77 and 79, respectively, which are appropriately mounted to the frame 42. As further illustrated in FIG. 15 and FIG. 19, chain tracks 77 and 79 each comprise a plurality of support angles 81 which are welded to frame 42 at spaced intervals. Tracks 77 and 79 further comprise guide rails 83 having downwardly extending studs 84. Rails 83 are secured to angles 81 by nuts 85. Nuts 85 are each threaded onto a stud 84 after the stud 84 is inserted through a passage in an angle 81. Each chain track 77 and 79 further comprises a plurality of chain hold down brackets 86 which are each connected to one of a plurality of hold down stub members 87 at spaced intervals. Stub members 87 are welded to frame 42 and brackets 86 are connected to stub members 87 by bolts 88. Chain hold down strip members 89 are welded or otherwise connected to a plurality of spacers 90, each of which are welded or otherwise connected to a bracket 86. As illustrated in FIG. 15 and FIG. 19, guide rail 83 comprises an ultra high molecular weight (UHMW) polyethylene material 83a which is secured to a base 83b in a press fit. As illustrated in FIG. 1, the bucket drive mechanism is designed to transport the buckets 44 in a continuous or closed travel path from the infeed station 46 to the discharge stations and back to the infeed station 46 and so on. The arrows in FIG. 1 indicate the direction of travel or movement of the buckets 44 during operation of the system 40.

Referring to FIGS. 5-7, each of the buckets 44 comprises a bucket shell or housing 91 having a substantially semicircular or concave shape which defines a cavity 92 having an inner surface 93. The buckets 44 are substantially identical and have substantially the same capacity to receive products 60 within cavity 92. The bucket shell 90 has a lip 94 along one edge thereof and a lip 96 along the opposite edge thereof. The bucket shell 91 is further provided with a first pivot boss 98 on one side thereof having a passage 100 therein and a second pivot boss 102 on the opposite side thereof having a passage 104 therein. One side of the bucket 44 is provided with a lower roller 106 which is rotatably mounted on a lower stud 108 having a passage 109 therein. Roller 106 is rotatable on stud 108 and secured thereto by an end cap 110 which is secured to stud 108 in a press fit within passage 109. The opposite side of the bucket 44 is provided with a first roller 112 rotatably mounted on a stud 114 having a passage therein and a second roller 116 rotatably mounted on a stud 118 having a passage therein. Rollers 112 and 116 are secured to studs 114 and 118, respectively, by end caps 115 and 119, respectively, in a manner similar to that described in connection with roller 106. First roller 112 and second roller 116 are substantially aligned. The bucket apparatus 44 further comprises a bracket 120 which is secured to bucket shell 90 by a pair of bolts 122 and 124 having corresponding nuts 123 and 125. Bolt 122 extends through a passage in shell 91 and a passage in bracket 120 and is secured by nut 123. Bolt 124 extends through a passage in shell 91 and a passage in bracket 120 and is secured by nut 125. The uppermost end of the bracket 120 is provided with a roller 126 rotatably mounted on a pin 128 which is welded to bracket 120. Roller 126 is rotatable on pin 128 and secured thereto by a retaining clip 129 which is received within a circumferential groove within pin 128.

Referring to FIG. 21 and FIG. 23, each of the buckets 44 are pivotally mounted to the chains 76 and 78 by the insertion of oppositely disposed pins 86 and 88 into bosses 98 and 102, respectively, such that, with respect to each of the buckets 44, a pin 86 is received within passage 100 within pivot boss 98 and a pin 88 substantially aligned with such pin 86 is received within passage 104 within pivot boss 102. When a plurality of buckets 44 are connected in series, as illustrated in FIG. 8, the edges of adjacent buckets 44 overlap throughout much of the bucket travel path. For example, when the buckets 44 travel in the direction illustrated by the arrows in FIG. 8 and pass immediately beneath the discharge end 49 of feeder 48, the lip 96 or trailing edge of a forward bucket 44a overlaps the lip 94 or leading edge of an adjacent, rearward bucket 44b. Likewise, the lip 96 or trailing edge of bucket 44b overlaps the lip 94 or leading edge of adjacent bucket 44c. However, as explained in greater detail hereinbelow, the buckets 44 undergo a tail change or reverse of their overlap at two locations in the course of their travel.

Referring again to FIG. 8, the feeding of products 60 to the buckets 44 will be described in greater detail. For purposes of clarity, buckets 44 are merely represented generally in FIG. 8. As each empty bucket shell 91 passes immediately beneath the discharge end 49 of the vibratory feeder 48 traveling in the direction indicated by the upper arrow in FIG. 8, products 60 are cascaded into the cavity 92 of the respective bucket shell 91. As point A of the bucket shell 91 passes immediately beneath the discharge end 49, products 60 fall into the cavity 92 striking the sloping surface 93 of shell 91 at approximately point A and thereafter fall to the bottom of cavity 92, identified as point B. As the respective bucket shell 91 continues to pass beneath edge 49, additional products 60 will fall into cavity 92. As point B of the bucket shell 91 passes immediately beneath the discharge end 49, the respective bucket shell 91 will be filled to approximately one-half of its depth. As the bucket shell 91 passes beneath the discharge end 49 from point B to point C, additional products 60 will fall into cavity 92 atop the products 60 therein. Due to the concave shape of bucket shell 91, the horizontal drop distance between the bottom of feeder 48 and the point at which the products 60 strike inner surface 93 or additional products 60 within the bucket shell 91 will be minimized as the bucket shell 91 passes beneath discharge end 49 from point A to point C. In the preferred embodiment, there is a horizontal distance of approximately three fourths inch ($\frac{3}{4}''$) from the bottom of the feed pan of feeder 48 to the top of the bucket shell 91 passing immediately beneath feeder 48.

Referring to FIG. 9, the bucket trip apparatus associated with each primary discharge station 52 will be described in greater detail. Sequential positions of a representative bucket 44 are identified by the letters A-I on the bucket 44. When a bucket 44 is in position A, traveling in the forward direction illustrated by the arrow in FIG. 9, and approaches a discharge station 52, a trip arm 130 may be activated so as to pivot downward from a substantially horizontal position (shown in hidden lines in FIG. 9) to the position illustrated in FIG. 9. As the bucket 44 continues to travel in the forward direction illustrated by the arrow in FIG. 9 and reaches position B, roller 126 will strike the bottom surface 131 of activated trip arm 130, thereby causing the bucket 44 to pivot in the direction indicated by the arrow on bucket 44 in position B. As the bucket 44 simultaneously pivots and continues its forward travel, roller 126 rolls along surface 131 and roller 112 is urged below an upper track member 132, as illustrated by bucket 44 in position C. As bucket 44 continues to pivot and travel forward, roller 116 will strike cam 134 and roll along camming surface 135 of cam 134, as illustrated by bucket 44 in position D. When a bucket 44 is in position D, the bucket 44 is pivoted approximately ninety (90) degrees and the distance D, from the trailing edge of bucket 44 to the bottom of the receiving pan of feeder 54 is approximately three inches (3''). Further, as bucket 44 pivots from position A to position D, any and all products 60 within bucket 44 will be gradually discharged into the receiving pan of feeder 54. As bucket 44 continues to travel forward and roller 116 continues to roll along camming surface 135, roller 112 is received within a slot or track 136 defined by upper track member 132 and a lower track member 138, as illustrated by bucket 44 in position E. As bucket 44 continues to travel forward and roller 112 passes through track 136, the underside 133 of track member 132 will provide a camming surface against which roller 112 will roll, as illustrated by bucket 44 in position F. As bucket 44 continues to travel forward and roller 112 passes outward from slot 136, bucket 44 will return to a substantially level orientation, as illustrated sequentially by bucket 44 in positions G, H, and I. However, a guide rail 140 is provided for assuring that the leading or forward edge of bucket 44 is urged downward so as to return a bucket 44 to substantially level orientation. That is, the leading edge of bucket 44 may strike the underside 141 of rail 140 so as to be urged downward as the bucket 44 continues to travel forward.

Figure 10:
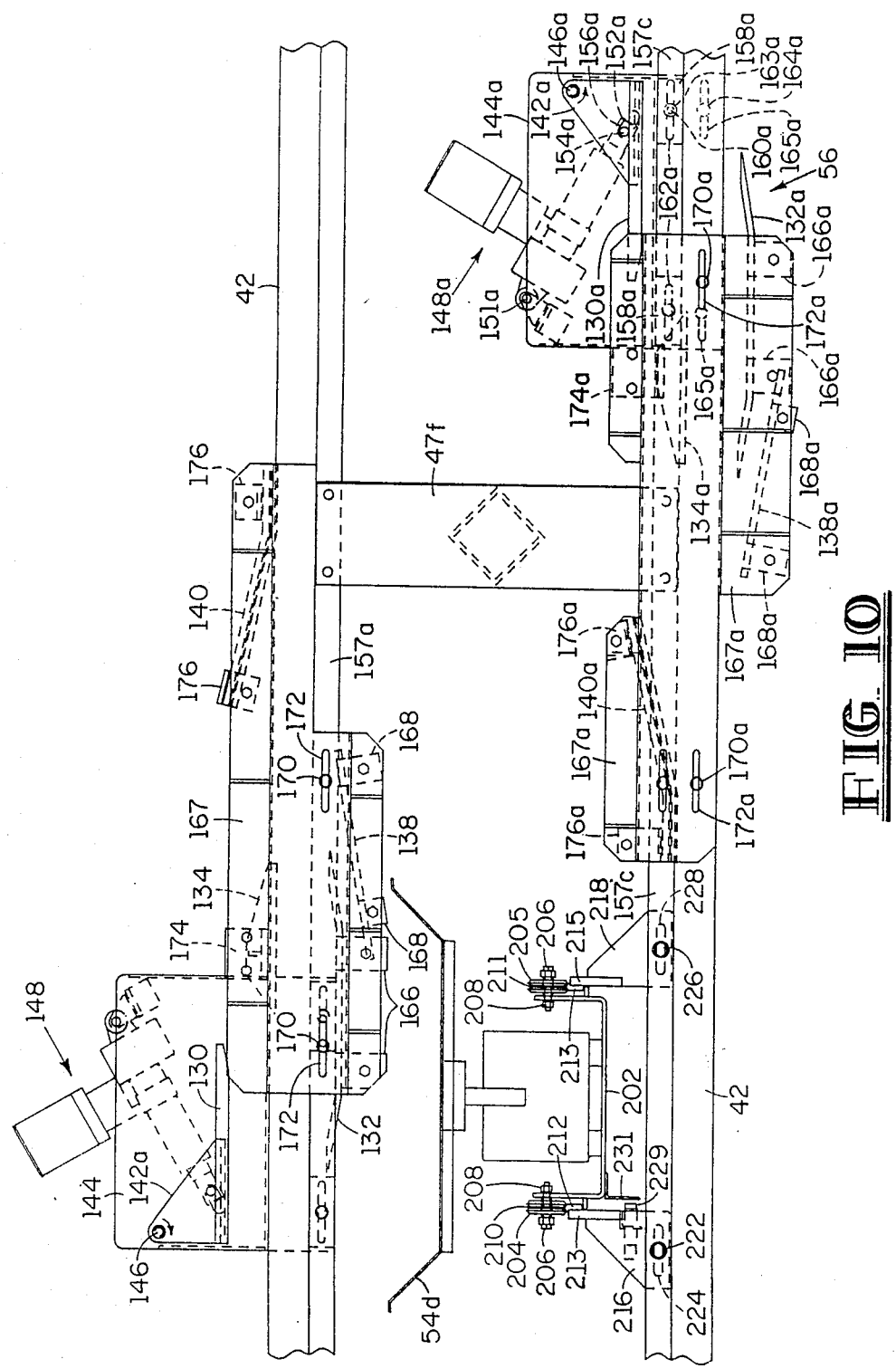
FIG. 10 is a partial side view of the preferred embodiment of the bucket distribution system of the present invention illustrating the bucket trip apparatus for the terminal primary distribution station and auxiliary distribution station.
Figure 16:
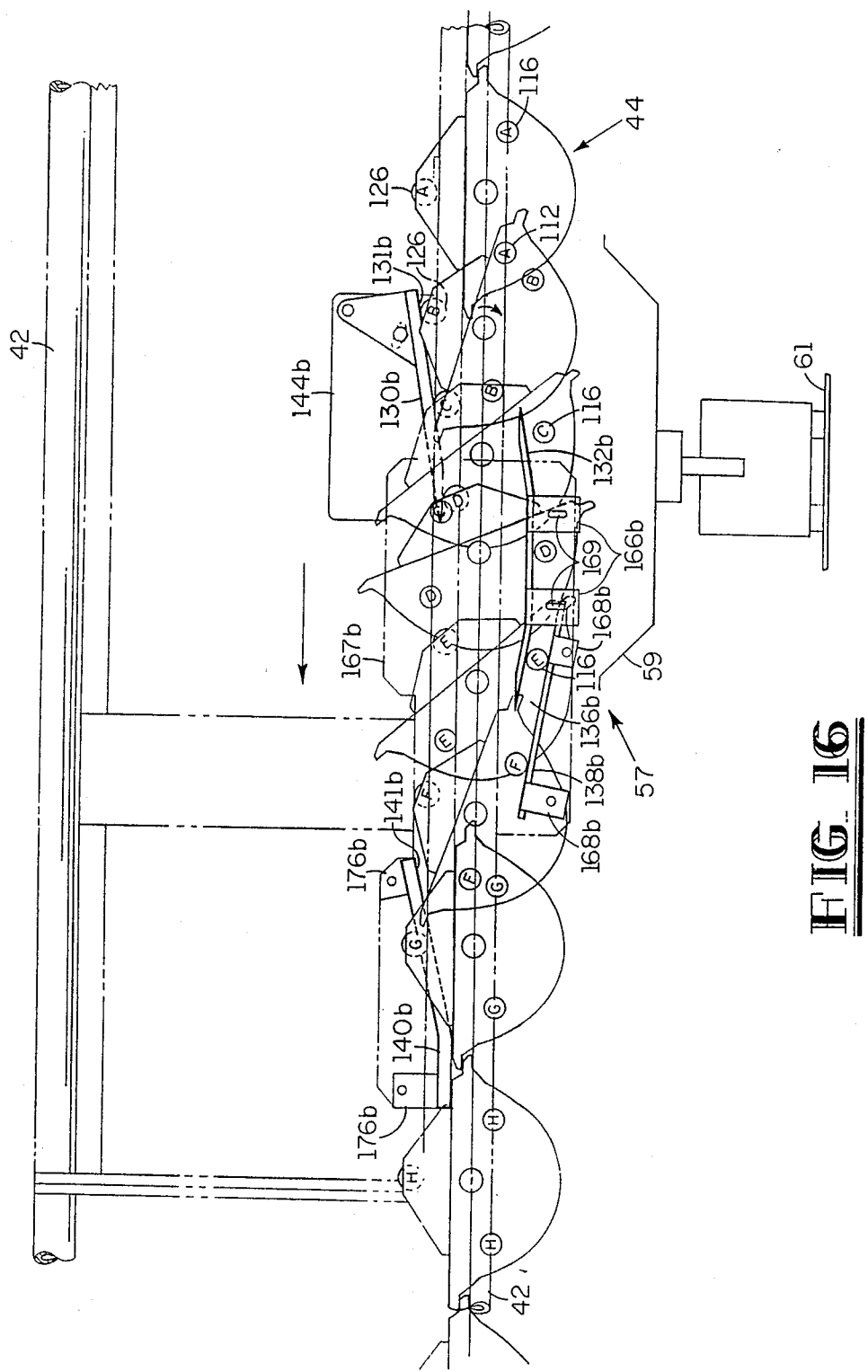
FIG. 16 is a partial side view of the bucket trip apparatus for the secondary distribution station in the preferred embodiment of the bucket distribution system of the present invention.
Figure 17:
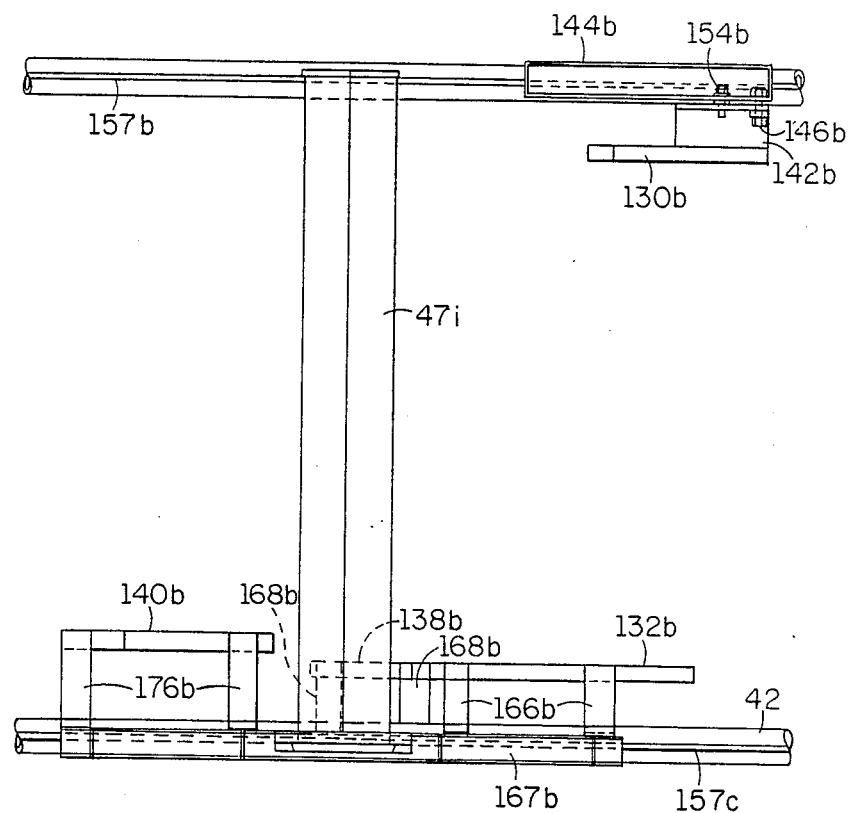
FIG. 17 is a partial top view of the bucket trip apparatus for the secondary distribution station in the preferred embodiment of the bucket distribution system of the present invention.
Figure 18:
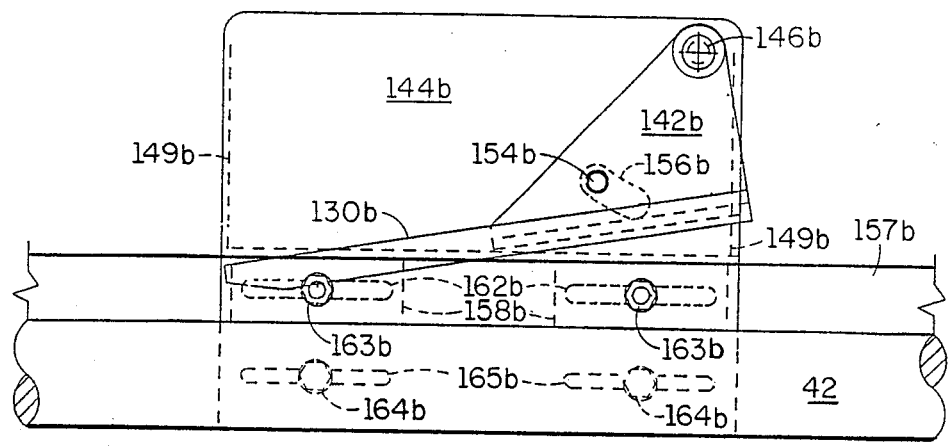
FIG. 18 is a partial side view of the bucket trip apparatus for the secondary distribution station in the preferred embodiment of the bucket distribution system of the present invention.

Referring to FIG. 10, FIG. 11 and FIGS. 13-15, the bucket trip apparatus associated with each primary discharge station 52 will be described in greater detail. Trip arm 130 is welded or otherwise connected to a right angle bracket 142 which is pivotally connected to a bracket 144 by a bolt 146 and a corresponding nut 147. Bracket 144 is adjustably connected to frame 42. Bolt 146 extends through a passage in bracket 142 and a passage in bracket 144 and is secured thereto by nut 147. A spacer 143 may be positioned about bolt 146 between the head of bolt 146 and bracket 142 and a spacer 145 may be positioned about bolt 146 between bracket 142 and bracket 144. An electromechanical linear actuator 148 is mounted to bracket 144 by a pivot bracket 150. Actuator 148 is pivotally connected to bracket 150 by a pin 151 which extends through a passage in actuator 148 and a pair of holes in bracket 150 on opposite sides of the actuator passage. Pin 151 is secured on each end thereof by a snap ring (not shown) and bracket 150 is welded or otherwise connected to bracket 144. The extendable and retractable arm 152 of actuator 148 is operatively engaged with bracket 142 by a bolt 154 which extends through a passage in arm 152 and an oblong slot 156 in bracket 144, and is threaded into tapped threads in bracket 142. An adjustment nut 153 may be threaded to bolt 154 intermediate to arm 152 and bracket 144 and a spacer 155 may be positioned about bolt 154 intermediate to bracket 142 and bracket 144. When actuator 148 is deactivated and arm 152 is thereby retracted, as illustrated in FIG. 10 and FIG. 13, trip arm 130 will be in its substantially level or horizontal position. However, when actuator 148 is activated and arm 152 is thereby extended, trip arm 130 and bracket 142 are pivoted about bolt 146, in the direction illustrated by the arrow on bracket 142 in FIG. 10, to the position shown in hidden lines in FIG. 13.

Referring again to FIG. 10, FIG. 13 and FIG. 15, a support bar 157 is welded to frame 42. A pair of spacers 158 are positioned intermediate bracket 144 and bar 157. A pair of bolts 160 each extend through one of a pair of oblong slots 162 in bracket 144, a passage in a spacer 158, and a passage in bar 157. Each of the bolts 160 is secured by a nut 163. Referring to FIG. 13 and FIG. 14, a pair of bolts 164 each extend through one of a pair of oblong slots 165 in bracket 144 in threaded engagement with tapped threads in frame 42. Bracket 144 may be readily repositioned along the length of frame 42 by loosening bolts 164 and nuts 163, moving bracket 144 to the left or right, and retightening bolts 164 and nuts 163. Bracket 144 may have a pair of support gussets 149 welded thereto. For purposes of clarity, gussets 149 are not shown in FIG. 15.

Referring again to FIG. 10 and FIG. 11, a pair of brackets 166 are welded or otherwise connected to track member 132 and bolted or otherwise connected to a bracket 167. A pair of brackets 168 are welded or otherwise connected to track member 138 and bolted or otherwise connected to bracket 167. Bracket 167 is adjustably connected to a support bar 157a by means of a pair of bolts 170, each of which extend through one of a pair of oblong slots 172 in bracket 167 and a passage in bar 157a. Each of the bolts 170 are secured by a nut. Bracket 167 may be readily repositioned along the length of frame 42 by loosening the nuts associated with bolts 170, moving bracket 167 to the left or right, and retightening the nuts associated with bolts 170. Support bar 157a is welded to frame 42. A bracket 174 is welded or otherwise connected to cam 134 and bolted or otherwise connected to bracket 167. A pair of brackets 176 are bolted or otherwise connected to guide rail 140 and bolted or otherwise connected to bracket 167.

Referring to FIG. 10 and FIG. 12 the trip apparatus utilized in conjunction with auxiliary discharge station 56 will be described in greater detail. The components utilized in conjunction with station 56 are substantially the same as those utilized in conjunction with each of the primary discharge stations 52. However, the mounting of the various components is reversed, since the buckets 44 will be traveling in the opposite direction (toward the infeed station 46) when they pass station 56, as illustrated in FIG. 1. Referring again to FIG. 10 and FIG. 12, a trip arm 130a is welded or otherwise connected to a right angle bracket 142a which is pivotally connected to a bracket 144a by a bolt 146a and a corresponding nut 147a. Bracket 144a is adjustably connected to frame 42. Bolt 146a extends through a passage in bracket 142a and a passage in bracket 144a and is secured thereto by nut 147a. A spacer 143a may be positioned about bolt 146a between the head of bolt 146a and bracket 142a and a spacer 145a may be positioned about bolt 146a between bracket 142a and bracket 144a. An electromechanical actuator 148a is mounted to bracket 144a by a pivot bracket 150a. Actuator 148a is pivotally connected to bracket 150a by a pin 151a which extends through a passage in actuator 148a and a pair of holes in bracket 150a on opposite sides of the actuator passage. Pin 151a is secured on each end thereof by a snap ring (not shown) and bracket 150a is welded or otherwise connected to bracket 144a. The extendable and retractable arm 152a of actuator 148a is operatively engaged with bracket 142a by a bolt 154a which extends through a passage in arm 152a and an oblong slot 156a in bracket 144a, and is threaded into tapped threads in bracket 142a. An adjustment nut 153a may be threaded to bolt 154a intermediate to arm 152a and bracket 144a and a spacer 155a may be positioned about bolt 154a intermediate to bracket 142a and bracket 144a. When actuator 148a is deactivated and arm 152a is thereby retracted, as illustrated in FIG. 10, trip arm 130a will be in a substantially level or horizontal position. However, when actuator 148a is activated and arm 152a is thereby extended, trip arm 130a and bracket 142a are pivoted downward about bolt 146a in the direction illustrated by the arrow on bracket 142a in FIG. 10 and in a manner similar to that described in connection with arm 130 and bracket 142.

Referring again to FIG. 10 and FIG. 12, a support bar 157b is welded to frame 42. A pair of spacers 158a are positioned intermediate to bracket 144a and bar 157b. A pair of bolts 160a each extend through one of a pair of oblong slots 162a in bracket 144a, a passage in a spacer 158a, and a passage in bar 157b. Each of the bolts 160a is secured by a nut 163a. A pair of bolts 164a each extend through one of a pair of oblong slots 165a in bracket 144a in threaded engagement with tapped threads in frame 42. The mounting of bracket 144a is similar to that described in connection with bracket 144b hereinbelow. Bracket 144a may be readily repositioned along the longitudinal axis of frame 42a by loosening bolts 164a and nuts 163a, moving bracket 144a to the left or right, and retightening bolts 164a and nuts 163a.

Referring again to FIG. 10 and FIG. 12, a pair of brackets 166a are welded or otherwise connected to track member 132a and bolted or otherwise connected to a bracket 167a. A pair of brackets 168a are welded or otherwise connected to track member 138a and bolted or otherwise connected to bracket 167a. Bracket 167a is adjustably connected to frame 42 and a support bar 157c by means of a plurality of bolts 170a, each of which extend through one of a plurality of oblong slots 172a in bracket 167a and a passage in frame 42 or bar 157c. Each of the bolts 170a are secured by a nut. Bracket 167a may be readily repositioned along the length of frame 42 by loosening the nuts associated with bolts 170a, moving bracket 167a to the left or right, and retightening the nuts associated with bolts 170a. Support bar 157c is welded to frame 42. A bracket 174a is welded or otherwise connected to cam 134a and bolted or otherwise connected to bracket 167a. A pair of brackets 176a are bolted or otherwise connected to guide rail 140a and bolted or otherwise connected to bracket 167a. A frame brace 47f may be bolted or otherwise connected to bars 157a and 157c. A frame brace 47g may be bolted or otherwise connected to bars 157 and 157a. A frame brace 47h may be bolted or otherwise connected to bars 157b and 157c.

Referring to FIGS. 16–19, the manually adjustable trip apparatus associated with secondary discharge station 57 will be described in detail. A trip arm 130b is welded or otherwise connected to a right angle bracket 142b which is pivotally connected to a bracket 144b by a bolt 146b and a corresponding nut 147b. Bracket 144b is adjustably connected to frame 42. Bolt 146b extends through a passage in bracket 142b and a passage in bracket 144b and is secured thereto by a nut 147b. A spacer 143b may be positioned about bolt 146b between the head of bolt 146b and bracket 142b and a spacer 145b may be positioned about bolt 146b between bracket 142b and bracket 144b. A bolt 154b extends through an oblong slot 156b in bracket 144b and is threaded into tapped threads in bracket 142b. A spacer 155b may be positioned about bolt 154b intermediate to bracket 142b and bracket 144b. Trip arm 130b may be adjustably positioned at a desired angle with respect to horizontal by loosening bolt 154b, pivoting arm 130b to the desired degree within the limits of slot 156b, and retightening bolt 154b.

Referring again to FIGS. 16–19, a pair of spacers 158b are positioned intermediate bracket 144b and bar 157b. A pair of bolts 160b each extend through one of a pair of oblong slots 162b in bracket 144b, a passage in a spacer 158b, and a passage in bar 157b. Each of the bolts 160b is secured by a nut 163b. A pair of bolts 164b each extend through one of a pair of oblong slots 165b in bracket 144b in threaded engagement with tapped threads in frame 42. Bracket 144b may be readily repositioned along the length of frame 42 by loosening bolts 164b and nuts 163b, moving bracket 144b to the left or right, and retightening bolts 164b and nuts 163b. Bracket 144b may have a pair of support gussets 149b welded thereto.

Referring again to FIG. 16 and FIG. 17, a pair of brackets 166b are welded or otherwise connected to track member 132b and adjustably connected to a bracket 167b. Bracket 167b is bolted or otherwise connected to frame 42 and bar 157c. Each bracket 166b has an oblong slot 169 therein. A pair of bolts each extend through a respective slot 169 and a respective passage in bracket 167b and are secured by a nut. Track member 132b may be raised or lowered relative to arm 130b by loosening the nuts associated with the bolts extending through slots 169, moving track 132b up or down, and retightening the nuts associated with the bolts extending through slots 169. A pair of brackets 168b are welded or otherwise connected to track member 138b and bolted or otherwise connected to bracket 167b. A pair of brackets 176b are bolted or otherwise connected to guide rail 140b and bolted or otherwise connected to bracket 167b. A frame brace 47i may be bolted or otherwise connected to bars 157b and 157c.

Referring again to FIG. 16, the pivoting of a bucket 44 at discharge station 57 will be described in further detail. Sequential positions of a representative bucket 44 are identified by the letters A–H on the bucket 44. It is to be understood that the position or angle of trip arm 130b will be preset by the system operator so as to effectuate the desired degree of pivoting of the buckets 44. When a bucket 44 is in position A, traveling in the forward direction illustrated by the arrow in FIG. 16, the bucket 44 is substantially level. As the bucket 44 continues to travel in the forward direction illustrated by the arrow in FIG. 16 and reaches position B, roller 126 will strike the bottom surface 131b of trip arm 130, thereby causing the bucket 44 to pivot in the direction indicated by the arrow on bucket 44 in position B. As the bucket 44 simultaneously pivots and continues its forward travel, roller 126 rolls along surface 131b and roller 116 is urged below an upper track member 132b, as illustrated by bucket 44 in position C. As bucket 44 continues traveling forward and roller 126 continues to roll along the bottom surface 131b, bucket 44 will continue to pivot, as illustrated by bucket 44 in position D. As bucket 44 pivots from position A to position D, any and all products 60 within bucket 44 in excess of a predetermined portion of products 60 will be gradually discharged into the receiving pan of feeder 59. As bucket 44 continues to travel forward, roller 116 is received within a slot or track 136b defined by upper track member 132b and lower track member 138b, as illustrated by bucket 44 in position E. As bucket 44 continues to travel forward, roller 116 will roll along track member 138b, as illustrated by bucket 44 in position F. As bucket 44 continues to travel forward, bucket 44 will return to a substantially level orientation, as illustrated sequentially by bucket 44 in positions F, G, and H. Guide rail 140b is provided for assuring that the forward edge of bucket 44 is urged downward so as to return a bucket 44 to a substantially level orientation. That is, the leading edge of bucket 44 may strike the underside 141b of rail 140b so as to be urged downward as the bucket 44 continues to travel forward.

It is to be understood that buckets 44 will remain upright or in a substantially level orientation throughout their travel path, except when the buckets 44 are pivoted at a distribution station or undergoing a tail change. Further, it is to be understood that the buckets 44 will pivot about an axis which is substantially transverse to the longitudinal axis of the frame 42. Further, pins 86 and 88 are substantially aligned along the axis about which the buckets 44 pivot. When the buckets 44 are moving in the direction illustrated by the upper arrow in FIG. 1 away from infeed station 46, and are pivoted at a station 52 from position A to position D illustrated in FIG. 9, the buckets 44 will pivot counterclockwise (as viewed in FIG. 1) such that the leading or forward edge thereof is pivoted upward and rearward and the trailing or rearward edge thereof is pivoted downward and forward. When the buckets 44 are moving toward infeed station 46 in the direction illustrated by the lower arrow in FIG. 1, and are pivoted at station 57 from position A to position D illustrated in FIG. 16, the buckets 44 will pivot clockwise (as viewed in FIG. 1) such that the leading or forward edge thereof is pivoted upward and rearward and the trailing or rearward edge thereof is pivoted downward and forward. It is also to be understood that trip arm 130 will pivot approximately fifteen (15) degrees from horizontal at discharge stations 52 upon activation of actuator 148 to thereby effectuate a maximum bucket pivot of approximately (90) degrees. Trip arm 130b will be set at an angle of approximately seven and one half (7.5) degrees from horizontal at discharge station 57 to thereby effectuate a maximum bucket pivot of approximately forty five (45) degrees.

It is to be understood that auxiliary station 56 will operate in a manner similar to that described in connection with a station 52. However, roller 116, rather than roller 112, will be received within track 136a, due to the fact that a bucket 44 will pivot in a direction counter to the pivot of a bucket 44 at a station 52. If auxiliary station 56 is in operation, trip arm 130a will be pivoted approximately fifteen (15) degrees from horizontal and buckets 44 will thereby be pivoted approximately ninety (90) degrees so as to discharge any and all products 60 located therein. Further, when auxiliary station 56 is in operation, primary stations 52 are disabled. Auxiliary station 56 may be operated prior to cleaning buckets 44 so as to discharge any products 60 therefrom.

Figure 20:
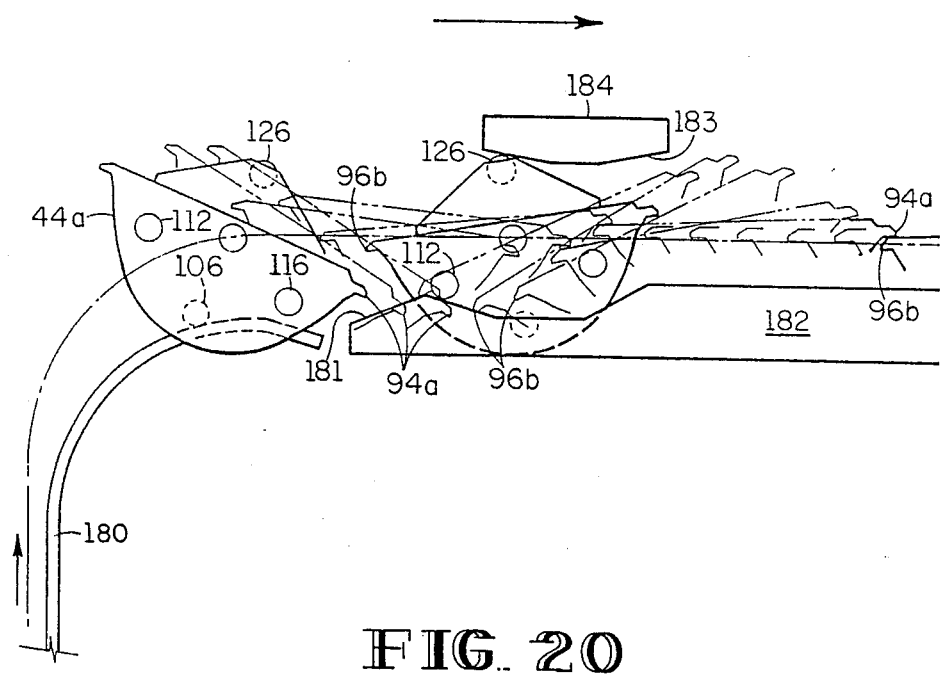
FIG. 20 is a side view of the upper tail change apparatus in the preferred embodiment of the bucket distribution system of the present invention taken along lines 20—20 of FIG. 21.

Referring to FIG. 20 and FIG. 21, the upper tail change camming apparatus of the present invention will be described with reference to a rearward bucket 44a and a forward bucket 44b, it being understood that each of the buckets 44 will be both a rearward bucket 44a and a forward bucket 44b during the course of its travel within the system 40. As indicated hereinabove, the trailing edge 96b of bucket 44b overlaps the leading edge 94a of bucket 44a at infeed station 46. As the buckets 44a and 44b travel vertically upward from the boot or infeed station 46 of the bucket distribution system 40 toward position T illustrated in FIG. 1, the roller 106 of each of the buckets 44a and 44b rolls along a guide rail 180. The leading edge 94a of rearward bucket 44a is urged downward as bucket 44a travels forward in the direction illustrated by the arrow in FIG. 20 and roller 106 rolls along the uppermost end of rail 180. As rearward bucket 44a continues traveling forward, leading edge 94a will continue to be urged downward until roller 116 strikes cam 182 so as to roll along camming surface 181 of cam 182. At the time the forward edge 94a of rearward bucket 44a is being urged downward, the rearward edge 96b of forward bucket 44b is being urged downward by the interaction of surface 181 of cam 182 on roller 112 and camming surface 183 of cam 184 on roller 126. However, when roller 116 of bucket 44a rolls along camming surface 181, leading edge 94a is urged upward and over trailing edge 96b of bucket 44b. Further, trailing edge 96b will gradually be urged upward so as to return to its normally level orientation. When the interaction of cams 182 and 184 has been completed, the forward edge 94a of bucket 44a will overlap the rearward edge 96b of bucket 44b, as illustrated in FIG. 20, thereby allowing the buckets to pivot at stations 52, 56, and 57 in the manner described hereinabove. In summary, cams 182 and 184 function to pivot a bucket 44 so as to urge the leading edge thereof upward over the trailing edge of an adjacent forward bucket 44 and the trailing edge thereof downward beneath the leading edge of an adjacent rearward bucket 44.

Referring again to FIG. 21, rail 180 is welded or otherwise connected to a rail bracket 180a which is welded or otherwise connected to a frame brace 47. Cam 182 is welded or otherwise connected to a cam bracket 182a which is welded or otherwise connected to a frame brace 47a. Braces 47 and 47a are welded or otherwise connected to frame 42. Cam 184 is welded or otherwise connected to a cam bracket 184a which is welded or otherwise connected to bracket 86.

Referring to FIG. 22 and FIG. 23, the lower tail change camming apparatus of the present invention will be described with reference to a rearward bucket 44a and a forward bucket 44b, it being understood that each of the buckets 44 will be both a rearward bucket 44a and a forward bucket 44b in the course of its travel within the system 40. As indicated hereinabove, the leading edge of rearward bucket 44a overlaps the trailing edge of forward bucket 44b as the buckets 44 pass discharge stations 52, 56, and 57. As a bucket 44 travels vertically downward toward position T, illustrated in FIG. 1, the trailing edge thereof will first engage camming surface 191 of cam 190 and thereafter roller 126 will engage a guide rail 192. As the bucket 44 continues its forward travel, as illustrated by the arrow in FIG. 22, roller 116 will engage cam 194 so as to roll along camming surface 195 of cam 194. As roller 116 rolls along camming surface 195 and roller 126 rolls along guide rail 192, the leading edge 94a of the bucket 44 will be urged upward. However, as the bucket 44 continues to travel forward and roller 116 continues to roll along camming surface 195, as illustrated by rearward bucket 44a, the forward edge 94a of bucket 44a will begin to be urged downward as bucket 44a pivots in the direction indicated by the arrow on bucket 44a. As forward edge 94a of bucket 44a is being urged downward, roller 106 of forward bucket 44b rolls along camming surface 197 of cam 196, thereby pivoting bucket 44b in the direction indicated by the arrow on bucket 44b and causing the trailing edge 96b of bucket 44b to be urged upward and over leading edge 94a of bucket 44a. As roller 106 of bucket 44b rolls off of cam 196, forward bucket 44b will return to a substantially level orientation. Upon completion of the lower tail change, the trailing edge 96b of forward bucket 44b will overlap the leading edge 94a of rearward bucket 44a.

Referring again to FIG. 23, cam 190 is welded or otherwise connected to a pair of cam brackets 190a which are welded or otherwise connected to frame brace 47c. Rail 192 is welded or otherwise connected to rail bracket 192a which is welded or otherwise connected to frame brace 47c. Cam 194 is welded or otherwise connected to cam bracket 194a which is welded or otherwise connected to frame brace 47d. Cam 196 is welded or otherwise connected to cam bracket 196a which is welded or otherwise connected to frame brace 47c. Braces 47c, 47d, and 47e are welded to frame 42.

Referring to FIGS. 10 and 24-26, the retractable feeder apparatus associated with each primary distribution station 52 comprises a conveyor support bracket 202 having a plurality of rollers or wheels 204 mounted thereto on one side thereof and a plurality of rollers or wheels 205 mounted thereto on the opposite side thereof. A bolt 206 extends through approximately the center of each roller 204 and 205 and a passage in the bracket 202. Each of the rollers 204 and 205 is freely rotatable on its respective bolt 206 and each bolt 206 is secured to the bracket 202 by a nut 208. A feeder 54 is mounted atop, and supported by, bracket 202.

Referring again to FIGS. 10 and 24, each of the rollers 204 has a circumferential groove 210 therein which is adapted to receive a first rail 212. Each of the rollers 205 has a circumferential groove 211 therein which is adapted to receive a second rail 214. Rails 212 and 214 are welded or otherwise connected to extension bars 213 and 215, respectively. Bars 213 and 215 are welded or otherwise connected to a pair of support brackets 216 and a pair of support brackets 218, respectively. Brackets 216 are adjustably mounted to support bars 157b and 157c and brackets 218 are adjustably mounted to support bars 157b and 157c. A bolt 222 extends through an oblong slot 224 in each bracket 216 and a respective passage in bars 157b and 157c and is secured by a nut. A bolt 226 extends through an oblong slot 228 in each bracket 218 and a respective passage in bars 157b and 157c. When it is desired to move the feeder 54 to the left or right along the length of frame 42, the nuts associated with bolts 222 and 226 are loosened, brackets 216 and 218 are moved to the left or right, and the nuts associated with bolts 222 and 226 are thereafter retightened.

Figure 25:
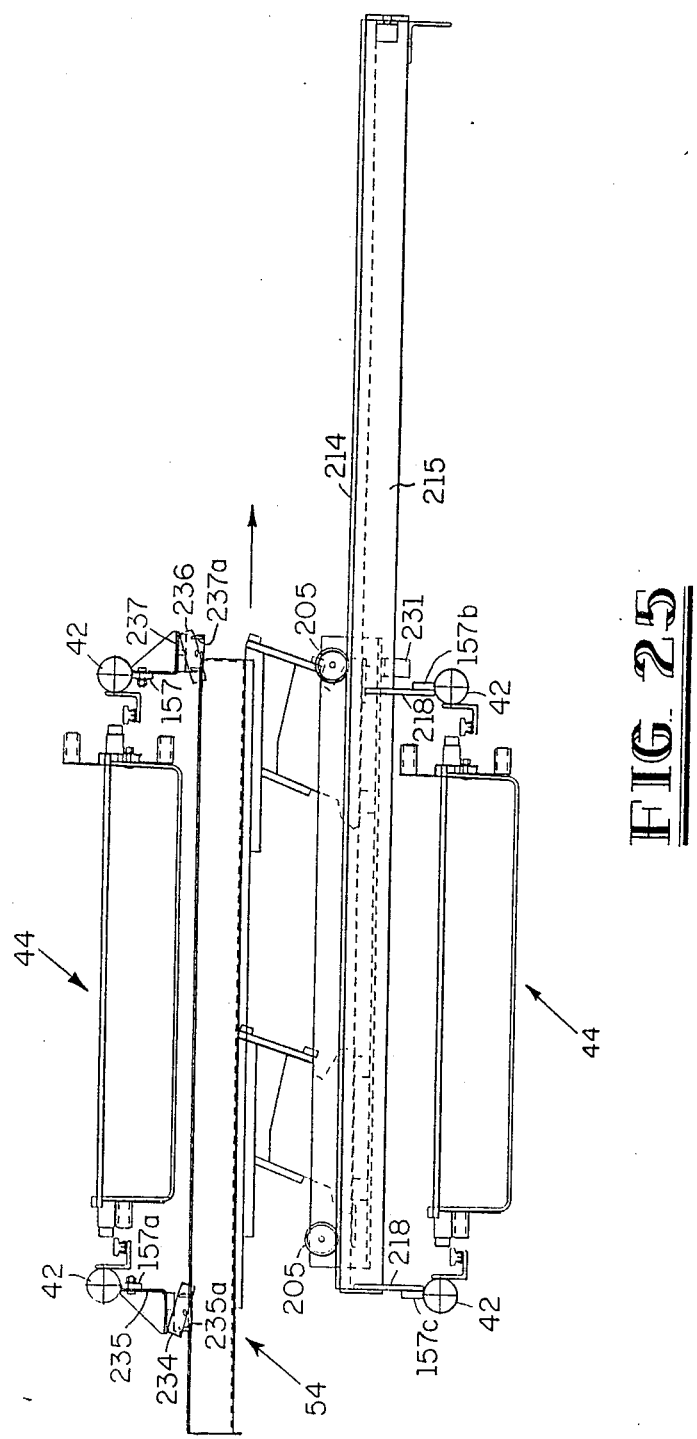
FIG. 25 is a partial end view of a primary discharge station utilized in the preferred embodiment of the bucket distribution system of the present invention illustrating the retractable feeder apparatus in active position.
Figure 26:
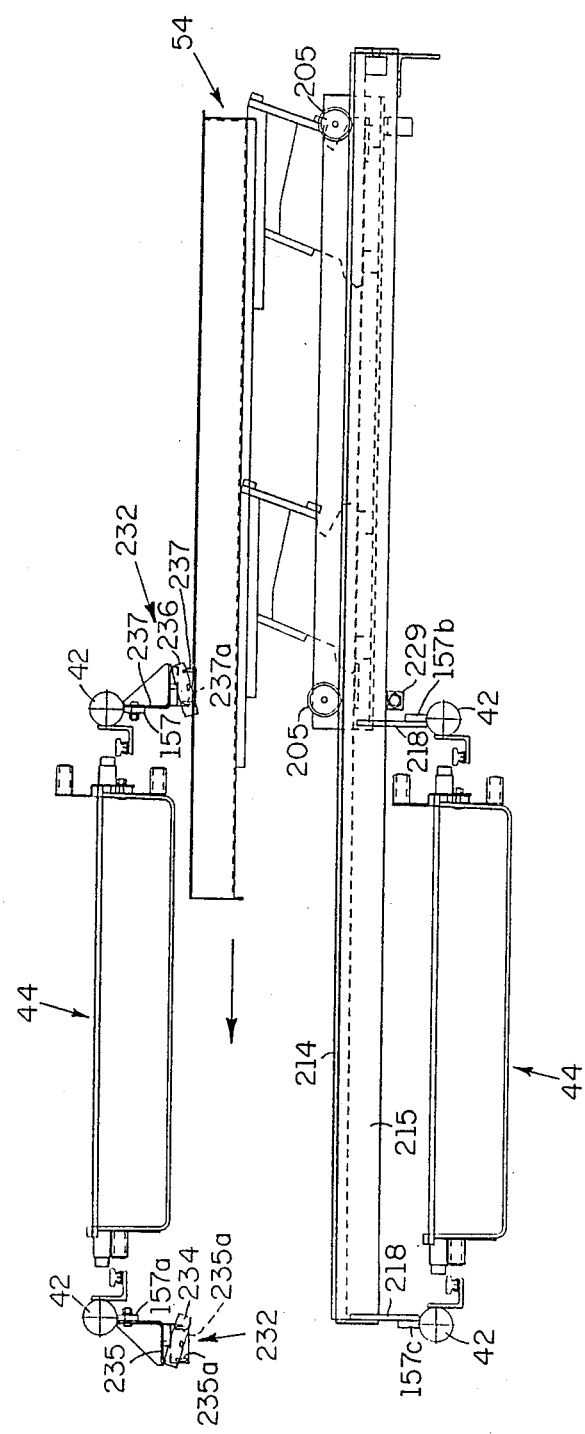
FIG. 26 is a partial end view of a primary discharge station in the preferred embodiment of the bucket distribution system of the present invention illustrating the retractable feeder apparatus in servicing position.
Figure 27:
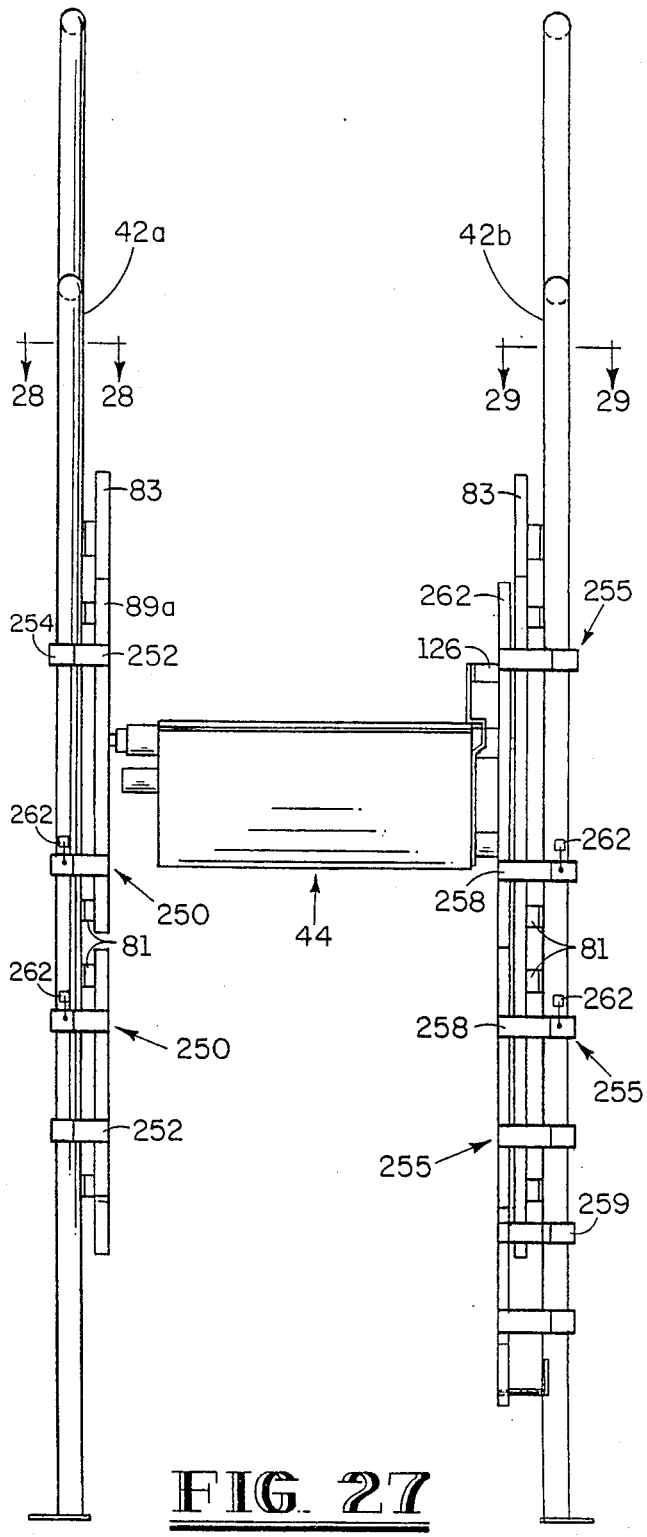
FIG. 27 is an elevation view taken along lines 27—27 of FIG. 1 illustrating the bucket addition and removal apparatus in the preferred embodiment of the bucket distribution system of the present invention.
Figure 28:
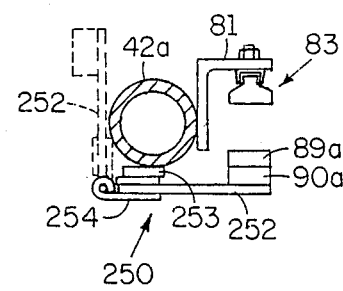
FIG. 28 is a cross-sectional view of one side of the bucket addition and removal apparatus in the preferred embodiment of the bucket distribution system of the present invention taken along section lines 28—28 in FIG. 27.
Figure 30:
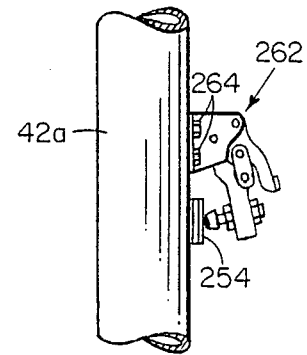
FIG. 30 is a side view of a portion of the bucket addition and removal apparatus in the preferred embodiment of the bucket distribution system of the present invention illustrating a toggle clamp.
Figure 29:
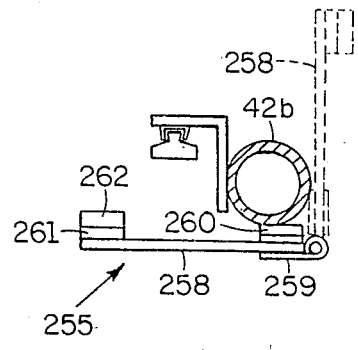
FIG. 29 is a cross-sectional view of the opposite side of the bucket addition and removal apparatus in the preferred embodiment of the bucket distribution system of the present invention taken along section lines 29—29 in FIG. 27.

Referring again to FIGS. 24–26, rollers 204 and 205 are mounted atop rails 212 and 214, respectively, so as to permit movement of conveyor 54 along the length or longitudinal axis of the rails 212 and 214. FIG. 25 illustrates the conveyor 54 in position to receive products 60 from buckets 44. A magnetic field type proximity switch 229 is bolted to a bracket 230 which is welded or otherwise connected to bar 213. A feeder position bracket 231 is welded or otherwise connected to the underside of bracket 202 so as to permit switch 229 to sense when conveyor 54 is in position to receive products 60. However, when the conveyor 54 is manually urged in the direction indicated by the arrow in FIG. 25, rollers 204 and 205 will roll along rails 212 and 214, respectively, until conveyor 54 is in the position illustrated in FIG. 26. When the conveyor 54 is in the position illustrated in FIG. 26, the proximity switch 229 will indicate that the conveyor 54 is not in position to receive products and the actuator 148 associated with the respective distribution station 52 will be disabled. When the conveyor 54 is in the "inactive" position illustrated in FIG. 26 it may be cleaned or otherwise serviced. When it is desired to return conveyor 54 to the "active" position illustrated in FIG. 25, conveyor 54 is manually urged in the direction indicated by the arrow in FIG. 26 with rollers 204 and 205 thereby rolling along rails 212 and 214, respectively, until conveyor 54 is in the position illustrated in FIG. 25.

Referring again to FIG. 24 and FIG. 25, each primary distribution station 52 further comprises a "through beam" photodetector 232 for sensing the presence of sufficient products 60 within feeder 54. The photodetector 232 comprises a sender member 234 adjustably mounted to a bracket 235 and a receiver member 236 adjustably mounted to a bracket 237. Sender member 234 is adjustably mounted to bracket 235 by a pair of bolts, each of which extend through a passage in member 234 and one of a pair of slots 235a in bracket 235 and are secured by a nut. Receiver member 236 is adjustably mounted to bracket 237 by a pair of bolts, each of which extend through a passage in member 236 and one of a pair of slots 237a in bracket 237 and are secured by a nut. Brackets 235 and 237 are bolted to bars 157a and 157, respectively. The relative positions of sender member 234 and receiver member 236 may be angularly adjusted to vary the predetermined amount of products 60 within feeder 54 which is necessary to block the light path of the photodetector 232, thereby causing photodetector 232 to sense sufficient products 60 within feeder 54.

Referring to FIGS. 27–30, the bucket addition and removal apparatus of the present invention comprises a plurality of hinge members 250 mounted to frame member 42a at spaced intervals. Each hinge member 250 comprises a chain hold down bracket 252 which is welded or otherwise connected to a slip hinge 254. Each hinge 254 is welded to one of a plurality of hinge plates 253 which are welded to frame member 42a at spaced intervals. Each bracket 252 is welded to a spacer 90a which is welded to a chain hold down strip member 89a. Member 89a is identical to members 89 but not connected thereto. The bucket addition and removal apparatus of the present invention further comprises a plurality of hinge members 255 mounted to frame member 42b at spaced intervals. Each hinge member 255 comprises a bucket control bar bracket 258 which is welded or otherwise connected to a slip hinge 259. Each hinge 259 is welded to one of a plurality of hinge plates 260 which are welded to frame member 42b at spaced intervals. A spacer 261 is welded to each bracket 258 and a bucket control bar 262. A plurality of conventional toggle clamps 263 are bolted to the frame members 42a and 42b by a plurality of bolts 264. Toggle clamps 262 are mounted to frame member 42a adjacent to one or more hinge members 250 and mounted to frame member 42b adjacent to one or more hinge members 255. When it is desired to add buckets 44 to or remove buckets 44 from chains 76 and 78, toggle clamps 263 are unlocked or released so as to permit brackets 252 and 258 to be pivoted to the open position shown in hidden lines in FIG. 28 and FIG. 29, respectively, thereby exposing chains 76 and 78. Once buckets 44 have been added or removed, the brackets 252 and 258 may be repivoted to the closed position shown in FIG. 28 and locked in the closed position by clamps 262. Clamps 262 abut against hinges 254 and 259 when members 250 and 255 are in the closed and locked position.

Referring to FIGS. 31–33, the bucket cleaning apparatus of the present invention comprises an intermediate control bar 272 which is fixedly mounted to frame 42 by brackets 274 and 276 which are welded to bar 272 and frame 42. An upper bucket control member 278 is welded to a bearing 280 which is pivotally mounted on a stub shaft 282. Control member 278 comprises an arm 279 which is welded to bearing 280. Member 278 further comprises an extension member 281 and a spacer 279a which is welded to arm 279 and extension member 281. A cushion piece 281a may be glued or otherwise connected to arm 279. Stub shaft 282 is welded or otherwise connected to a plate 284 which is welded or otherwise connected to frame member 42a and has an upwardly curved slot 286 therein. A shaft 290 extends through slot 286 and one end of shaft 290 is welded or otherwise connected to arm 279 of control member 278. The opposite end of shaft 290 is threadably connected to an upper control member knob 292. A retaining ring 294 is welded to shaft 290 on the opposite side of plate 284 from knob 292.

Referring again to FIG. 31 and FIG. 32, a lower bucket control member 296 is welded to a bearing 298 which is pivotally mounted on a stub shaft 300. Control member 296 comprises an arm 297 which is welded to bearing 298 and an arm brace 299 which is welded to arm 297 and bearing 298. Stub shaft 300 is welded or otherwise connected to a plate 302 which is welded or otherwise connected to frame member 42a and has a downwardly curved slot 304 therein. A shaft 306 extends through slot 304 and one end of shaft 306 is welded or otherwise connected to control member 296. The opposite end of shaft 306 is threadably connected to a lower control member knob 308. A retaining ring 310 is welded to shaft 306 on the side of plate 302 opposite knob 308.

Referring to FIG. 34, the bucket cleaning apparatus of the present invention further comprises a three sided shield 312 having outwardly extending flanges 314 and 316 on opposite sides thereof. Flanges 314 and 316 have a plurality of keyed slots 315 and 317, respectively, therein. Slots 315 and 317 are adapted to receive bolts 311 which are threaded into tapped threads in frame members 42a and 42b, respectively. A resilient Neoprene skirt 318 is secured to the uppermost end 313 of shield 312 by a plurality of nuts 319 which are threaded onto studs which extend from the inside of shield 312 through respective holes in skirt 318.

Referring again to FIG. 31, the bucket cleaning apparatus of the present invention may be utilized to clean the buckets 44, without removing the buckets 44 from the system 40, in the following manner. The cleaning of the buckets 44 will be described with reference to various bucket positions, identified as 44a–44f. Assuming all of the buckets 44 are being cleaned, all of the buckets 44 will be in each position 44a–44f at some time during the cleaning process. System 40 is first set in the "jog" mode. In the jog mode, an operator controlled switch is utilized to temporarily activate the system 40 to cause incremental movement of the buckets 44. The buckets 44 move in their travel path as long as the operator activates the switch. However, the travel or movement of the buckets 44 stops when the switch is released by the operator. Once in the jog mode, a bucket 44 is brought to the position illustrated by bucket 44a in FIG. 31. Toggle clamps 262 along frame member 42b are thereafter released and bucket control bar 262 is pivoted outward to the position shown in FIG. 29. The buckets 44 are thereafter moved forward until bucket 44 previously in position 44a is in the position illustrated by bucket 44b in FIG. 31 and bar 272 is between roller 116 and boss 102 of the bucket 44 immediately ahead of the bucket in position 44b. Member 278 is thereafter moved from its retracted position, illustrated in hidden lines in FIG. 31, to its extended position illustrated in FIG. 31. Member 278 may be moved from its retracted position to its extended position by loosening knob 292, as illustrated in FIG. 33, pivoting member 278 outward, and retightening knob 292 so that it abuts against plate 284. The buckets 44 are thereafter moved downward until the bucket 44 which was immediately ahead of the bucket 44 in position 44b is in the position shown as bucket 44f in FIG. 31 and the bucket 44 which was in position 44b is in the position shown as bucket 44e in FIG. 31. As such bucket 44 immediately ahead of the bucket 44 in position 44b moves downward, it will remain substantially level. However, as the bucket 44 previously in position 44b is moved downward, roller 116 will engage member 281 so as to pivot the bucket 44 approximately ninety (90) degrees in the direction illustrated by the arrow on the bucket in position 44b in FIG. 31. As the bucket 44 previously in position 44b continues downward, rollers 112 and 116 will roll along bar 272 until the bucket 44 is in the position illustrated by bucket 44e. Each successive bucket 44 behind the bucket previously in position 44b will likewise be pivoted in a similar manner, illustrated in FIG. 31 by the buckets in positions 44c and 44d. Member 296 is thereafter moved from its retracted position, illustrated in hidden lines in FIG. 31, to its extended position illustrated in FIG. 31. Member 278 may be moved from its retracted position to its extended position by loosening knob 308 in the same manner as knob 292 is loosened, pivoting member 296 outward, and retightening knob 308 so that it abuts against plate 302. Shield 312 is thereafter mounted to frame members 42a and 42b by inserting bolts 311 through slots 315 and 317 respectively, and inserting skirt 318 behind the leading edge 96e of the bucket in position 44e. The bucket 44 in position 44e may thereafter be cleaned, with any products 60 or debris therein falling onto skirt 318 or shield 312. Once the bucket in position 44e has been cleaned, it may be moved downward, as illustrated in hidden lines in FIG. 31, thereby urging resilient skirt 318 downward, as further illustrated in hidden lines in FIG. 31. As the bucket formerly in position 44e is moved downward, roller 116 will roll along arm 297 so as to allow the bucket formerly in position 44e to pivot and return to its substantially level orientation, as illustrated by the bucket in position 44f in FIG. 31. As the buckets 44 move downward, the bucket 44 previously in position 44d will assume position 44e and skirt 318 will return to its previous position so as to now be behind the leading edge of the bucket now occupying position 44e. The bucket 44 in position 44e may thereafter be cleaned and thereafter pivoted to the position represented by bucket 44f in the manner described hereinabove. Successive buckets 44 may be moved downward and cleaned in a similar manner.

Once the cleaning of the buckets has been completed, shield 312 is removed from frame members 42a and 42b and member 278 is moved from its extended position illustrated in FIG. 31 to its retracted position, illustrated in hidden lines in FIG. 31. Member 278 may be moved from its extended position to its retracted position by loosening knob 292, as illustrated in FIG. 33, pivoting member 278 inward, and retightening knob 292 so that it abuts against plate 284. The buckets 44 are thereafter moved down until a substantially level bucket 44 is positioned immediately above member 296. Member 296 is thereafter removed from its extended position illustrated in FIG. 31 to its retracted position, illustrated in hidden lines in FIG. 31. Member 296 may be moved from its extended position to its retracted position by loosening knob 308 in the same manner as knob 292 is loosened, pivoting member 296 inward, and retightening knob 308 so that it abuts against plate 302. Bucket control bar 262 is thereafter pivoted back into its closed position illustrated in FIG. 27 and locked in place by the toggle clamps 262 mounted to frame member 42b.

The distribution system 40 is designed to operate in a "jog" mode, an "on demand" mode, or an "even distribution" mode. The jog mode is utilized for incremental movement of the buckets 44 during the cleaning thereof, as described hereinabove. When the system 40 is in the jog mode, auxiliary discharge station 56 is activated and each primary discharge station 52 is disabled. In the on demand mode, the distribution of products 60 at each primary distribution station 52 in operation is on a demand basis. In the even distribution mode, one or more buckets 44 are exclusively assigned to each primary distribution station 52 which is in operation. In the on demand mode and even distribution mode, the buckets 44 travel in continuous laps through the system 40.

Figure 35:
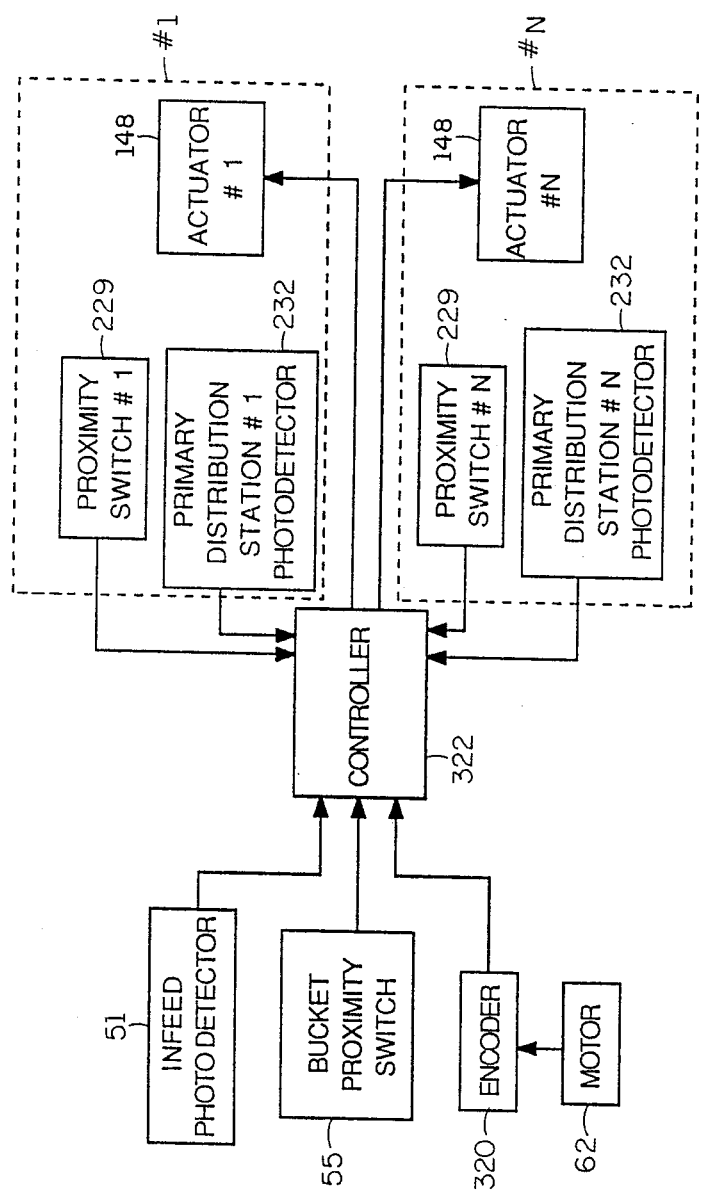
FIG. 35 is a block diagram illustrating the operation of the preferred embodiment of the bucket distribution system of the present invention.

Referring to FIG. 35, the operation of the distribution system 40 in the on demand mode or even distribution mode will be described in further detail. The feed rate of the feeder 48 and the travel speed of the buckets 44 are preferably set so that a predetermined portion of products 60 will be continuously fed to each of the buckets 44 as they pass infeed station 46 during operation of the system 40. The predetermined portion is such that each of the buckets 44 is adapted to receive a first predetermined portion of products and a second predetermined portion of products in addition to the first predetermined portion. In the preferred embodiment, the predetermined portion is an amount of products 60 approximately equivalent to forty percent (40%) of bucket capacity. During operation of the system 40, infeed photodetector 51 senses the feeding of products 60 to the buckets 44. The bucket proximity switch 55 senses the passage of each of the buckets 44 thereby. A conventional electromechanical encoder 320 coupled to the driveshaft 70 counts the rotations of the drive shaft 70 to track or monitor the movement of the buckets 44. The information from the photodetector 51, proximity switch 55, and encoder 320 is fed or signaled to a controller 322 which assigns a relative address to each of the buckets 44, by identifying the position or location of each of the buckets 44 within the bucket travel path, and labels each of the buckets 44 with a capacity status. Controller 322 is preferably a standard programmable logic controller manufactured by Allen-Bradley Corporation. During operation of the system 40, each of the buckets 44 has a capacity status of empty, half full, or full. When all of the buckets are empty and the system 40 is first started, an empty bucket 44 receiving the predetermined portion of products 60 for the first time will thereafter have a capacity status of half full. If a half full or full bucket 44 is tripped at a primary distribution station 52, all products 60 therein are discharged and its capacity status is thereafter relabeled by the controller 322 as empty. If a half full bucket 44 is not tripped at a primary distribution station 52, it will receive a second predetermined portion of products at the infeed station 46 and thereafter be relabeled as full by the controller 322 once it passes the bucket proximity switch 55. In the preferred embodiment, a full bucket has a first predetermined portion of products 60 therein and a second predetermined portion of products therein, totaling an amount of products 60 approximately equivalent to eighty percent (80%) of bucket capacity. If a full bucket is not tripped at a primary distribution station 52, it will be tripped at the secondary distribution station 57 and thereafter be relabeled by the controller 322 as half full. When a full bucket is tripped at the secondary distribution station 57, only an amount of products approximately equivalent to the amount of the predetermined portion of products is discharged. A half full bucket 44 returning to the infeed station 46 is relabeled as full once it receives a second portion of products 60 and passes the proximity switch 55. In short, the controller 322 tracks the capacity status of each of the buckets 44 and relabels a bucket 44 each time its capacity status changes during operation of the system 40.

Referring again to FIG. 35, the "on demand" mode of operation for the distribution system 40 will be described in greater detail. As used in FIG. 1, the symbol #1 identifies the first primary distribution station in operation, which in the following discussion is identified as station 52a. As indicated hereinabove, the controller 322 tracks the location and capacity status of each of the buckets 44 throughout the operation of the system 40. As a bucket 44 approaches primary discharge station 52a, controller 322 senses whether vibratory feeder 54a is in position by means of proximity switch 229 and whether the light path of the photodetector 232 at station 52a is blocked by products 60, thus indicating the presence of sufficient products 60 within the feeder 54a. If the nearest bucket 44 approaching station 52a is labeled as having products 60 therein (i.e., full or half full), proximity switch 229 indicates that feeder 54a is in position to receive products 60, and the photodetector 232 at station 52a indicates that feeder 54a does not have sufficient products 60 therein, controller 322 will signal the linear actuator 148 associated with distribution station 52a, thereby activating the linear actuator 148. When the actuator 148 is activated, the respective arm 130 is pivoted downward, thereby causing the bucket 44 to pivot and discharge products 60 into the feeder 54a in the manner described hereinabove. The linear actuator 148 will remain activated and one or more successive buckets 44 will be pivoted until the light path of the photodetector 232 at station 52a becomes blocked by products 60 within the feeder 54a and such blockage is sensed by the controller 322, thus indicating sufficient products 60 within feeder 54a. When controller 322 senses the presence of sufficient products 60 within feeder 54a, the controller 322 will deactivate actuator 148 at station 52a and will relabel the buckets 44 which were pivoted at station 52a as empty. The foregoing steps are repeated as each of the buckets 44 approaches each additional primary distribution station 52 which is in operation, identified generally in FIG. 35 by the symbol #N. That is, the foregoing steps are repeated with reference to the respective feeder 54, actuator 148, switch 229 and photodetector 232 associated with each additional primary distribution station 52 which is in operation.

Referring again to FIG. 35, the even distribution mode of operation of the system 40 will be described in greater detail. As the buckets 44 pass the bucket proximity switch 55, one or more buckets 44 (preferably 2) are assigned by the controller 322 to each distribution station 52 which is in operation. For example, if each discharge station 52 is in operation, two successive buckets 44 will be assigned to station 52a, the next two successive buckets 44 will be assigned to station 52b, the next two successive buckets 44 will be assigned to station 52c, the next two successive buckets 44 will be assigned to station 52d, the next two successive buckets 44 will be assigned to station 52a, and so on. However, if only two primary discharge stations 52 are operating, four buckets 44 are skipped in between the assigned buckets 44. For example, if only station 52a and 52b are operating, two successive buckets 44 will be assigned to station 52a, the next two successive buckets 44 will be assigned to station 52b, the next four successive buckets 44 will be bypassed, the next two successive buckets 44 will be assigned to station 52a, and the next two successive buckets 44 will assigned to station 52b, and so on. When a bucket 44 is bypassed, it receives products 60 at station 46 but is not tripped or pivoted at a primary distribution station 52. This feature is provided to keep from overloading the packaging machine P. As the buckets 44 reach the respective discharge station 52 to which they are assigned, controller 322 will sense whether the respective feeder 54 is in active position to receive products 60, as indicated by the respective proximity switch 229. If the feeder 54 at the assigned discharge station 52 is in position to receive products 60, controller 322 will signal the actuator 148 of the respective discharge station 52, thereby activating the respective actuator 148 and causing the respective actuator arm 130 to pivot and trip the assigned buckets 44 in the manner described hereinabove. The actuator 148 remains activated until the assigned buckets 44 are tripped. The controller 322 thereafter deactivates the respective actuator 148 and relabels the tripped buckets 44 as empty. In the even distribution mode, the respective photodetector 232 at the assigned station 52 remains active but is ignored by controller 322.

It is to be understood that the system operator will select the mode of operation and the particular stations 52 to receive products 60. The assignment of buckets 44 to particular stations 52 in the even distribution mode will also be selected by the system operator. It is also to be understood that controller 322 will signal the activation of actuator 148 only when certain conditions are satisfied. For example, the controller 322 signals the actuator 148 at a station 52 in the on demand mode only when a nearest approaching bucket 44 has products 60 therein, the respective feeder 54 is in active position, and the respective feeder 54 needs products 60. In this regard, it is to be understood that the controller 322 may be provided with additional inputs or conditions which must be satisfied before the actuator 148 will be activated. For example, a contact may be added to the ON/OFF switch of a packaging machine being fed by a feeder 54 and linked to the controller 322 such that the controller 322 is able to sense whether the packaging machine is ON and only signals the respective actuator 148 to trip buckets 44 if such packaging machine is ON.

It is to be understood that the controller 322 is able to identify the buckets 44 pivoted at a particular station 52 by monitoring the buckets passing proximity switch 55 while the respective actuator 148 is activated. Further, it is to be understood that in the on demand mode the controller 322 will not activate the respective actuator 148 if the nearest bucket 44 approaching the respective station 52 is empty. However, once the respective actuator 148 has been activated, it will remain activated until the demand of the respective station 52 is satisfied.

Regardless of whether the system 40 is in the "on demand" or "even distribution" mode, each of the buckets 44 will receive a first or second predetermined portion of products 60 at infeed station 46. In the preferred embodiment, the feed rate of the infeed vibratory feeder 48 and the bucket travel speed are set so that the predetermined portion of products comprises an amount of products approximately equivalent to forty percent (40%) of bucket capacity. That is, as each bucket passes beneath the infeed feeder 48, it will receive an amount of products 60 approximately equivalent to 40 percent (40%) of the bucket capacity. When an empty bucket reaches the discharge end 49 of feeder 48, the bucket 44 will receive a first predetermined portion of products 60 such that, in the preferred embodiment, the bucket will thereafter be approximately forty percent (40%) full and will have a capacity status of half full. That is, the first predetermined portion of products 60 comprises a first amount of products 60 approximately equivalent to forty percent (40%) of bucket capacity. If such a half full bucket is not thereafter tripped at a primary distribution station 52 during its lap through the system 40, it will be pivoted at secondary distribution station 57 but no products 60 will be discharged therefrom. In fact, the first predetermined portion of products 60 will be allowed to recirculate to the primary distribution stations 52. If a bucket 44 is already approximately forty percent (40%) full when it reaches the discharge end 49 of feeder 48, the bucket 44 will receive a second predetermined portion of products 60 in addition to the first predetermined portion of products 60 such that, in the preferred embodiment, the bucket will thereafter be approximately eighty percent (80%) full and will have a capacity status of full. That is, the second predetermined portion of products comprises a second amount of products 60 approximately equivalent to forty percent (40%) of bucket capacity. Further, the second amount of products 60 is approximately equivalent to the first amount of products 60. If a full bucket 44 is not tripped at a primary distribution station 52 during its lap through the system 40, it will be pivoted at the secondary distribution station 57 and any products 60 therein in excess of the amount of the first predetermined portion of products 60 will be discharged. The amount of products 60 discharged from a full bucket 44 at station 57 is approximately equivalent to the second amount of products 60. That is, outlet station 57 is adapted to discharge an amount of products 60 from a full bucket 44 approximately equivalent to forty percent (40%) of bucket capacity. The bucket 44 will thereafter have a capacity status of half full and the remaining products 60 therein will be allowed to recirculate to the primary stations 52. The system 40 thus allows products 60 to recirculate within the system 40, thereby providing at least twice the opportunity for the products 60 to be discharged and reducing the handling of the products 60 and the amount of products 60 taken off-line.

The system 40 permits temporary internal storage or accumulation of products 60 when one or more primary stations 52 are disrupted. That is, buckets 44 receiving a first portion of products 60 at infeed station 46 are thereafter transported to primary stations 52 and preferably tripped so as to discharge the products 60 therefrom. However, if a disruption should occur at any of the primary stations 52 receiving products 60, the buckets 44 which would have normally dumped at those stations 52 will bypass such stations 52 and recirculate past the infeed station 46, thus receiving a second predetermined portion of products 60 in addition to the first predetermined portion of products 60. Buckets 44 passing the terminal discharge station 52d and thereafter receiving a second portion of products 60 are said to contain stored or accumulated products 60. Once the disruption at the primary stations 52 is cleared, the accumulated products 60 will be discharged at the primary stations 52.

It is to be understood that the system 40 may be provided with any number of primary distribution stations 52. Further, it is to be understood that photodetector 51 is preferably bolted to a bracket which is similar to brackets 235 and 237 and such bracket is bolted or otherwise connected to frame 42. Further, it is to be understood that photodetector members 234 and 236 may be angularly adjusted by loosening the nuts securing members 234 and 236 to brackets 235 and 237, respectively, pivoting members 234 and 236 to the desired degree, and retightening the nuts securing members 234 and 236 to brackets 235 and 237, respectively. Photodetector 51 may be angularly adjusted in a similar manner. It is also to be understood that proximity switch 55 is preferably bolted to a bracket which is welded or otherwise appropriately connected to frame 42. Further, it is to be understood that products 60 received by outlet feeder 59 are typically conveyed by feeder 59 to another conveyor (not shown) for recirculation to station 46. Finally, it is to be understood that bucket shell 91, bosses 98 and 102, and studs 108, 114, and 118, are preferably molded as a unitary piece of plastic.

While the bucket distribution system of the present invention has been described in connection with the preferred embodiment, it is not intended to limit the invention to the particular form set forth, but on the contrary, it is intended to cover such alternatives, modifications, and equivalents, as may be included within the spirit and scope of the invention as defined by the appended claims.

We claim:

1. Apparatus for distributing products from an infeed station to a plurality of distribution stations, comprising:
    means for transporting a plurality of buckets in a continuous travel path, each of said buckets being adapted to receive a first predetermined portion of said products comprising a first amount of said products and a second predetermined portion comprising a second amount of said products in addition to said first amount;
    primary bucket trip means for pivoting selected ones of said buckets at each of said distribution stations to thereby discharge products within said buckets; and
    secondary bucket trip means for pivoting each of said buckets at an outlet station, said secondary bucket trip means being adapted to pivot said buckets so as to discharge products only from said buckets having said first and second portions of products therein, said secondary bucket trip means being further adapted to discharge only an amount of said products approximately equivalent to said second amount of said products.

2. Apparatus for distributing products, as recited in claim 1, further comprising means for receiving said products from said buckets at said distribution stations.

3. Apparatus for distributing products, as recited in claim 2, wherein said means for receiving said products comprises a feeder at each of said stations and wherein said apparatus further comprises means at each of said stations for moving said feeder into and out of position for receiving said products.

4. Apparatus for distributing products, as recited in claim 1, wherein said buckets move in a forward direction and said buckets are pivoted so as to discharge products therefrom in a manner such that a leading edge of each of said buckets is pivoted upward and rearward and a trailing edge of each of said buckets is pivoted downward and forward.

5. Apparatus for distributing products, as recited in claim 1, wherein said means for transporting said buckets comprises chain drive means supported by a frame and wherein said apparatus for distributing products further comprises means hingedly connected to said frame adapted to be pivoted so as to expose said chain drive means.

6. Apparatus for distributing products, as recited in claim 1, further comprising means for pivoting said buckets without removing said buckets from said chain drive means to facilitate cleaning of said buckets.

7. Apparatus for distributing products, as recited in claim 6, wherein said second amount of said products is approximately equivalent to said first amount of said products.

* * * * *